US012750307B2

(12) United States Patent
Kim et al.

(10) Patent No.: US 12,750,307 B2
(45) Date of Patent: Sep. 29, 2026

(54) MULTIPATH PDU SESSION

(71) Applicant: LG Electronics Inc., Seoul (KR)

(72) Inventors: Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 18/579,210

(22) PCT Filed: Jul. 12, 2022

(86) PCT No.: PCT/KR2022/010105

§ 371 (c)(1), (2) Date: Jan. 12, 2024

(87) PCT Pub. No.: WO2023/287154

PCT Pub. Date: Jan. 19, 2023

(65) Prior Publication Data

US 2024/0348534 A1 Oct. 17, 2024

(30) Foreign Application Priority Data

Jul. 14, 2021 (KR) ........................ 10-2021-0092394
Jul. 21, 2021 (KR) ........................ 10-2021-0095947
Feb. 25, 2022 (KR) ........................ 10-2022-0025014

(51) Int. Cl.
*H04W 76/12* (2018.01)
*H04L 45/24* (2022.01)
*H04W 76/15* (2018.01)

(52) U.S. Cl.
CPC ............. *H04L 45/24* (2013.01); *H04W 76/12* (2018.02); *H04W 76/15* (2018.02)

(58) Field of Classification Search
CPC ........ H04L 45/24; H04L 67/14; H04W 76/12; H04W 76/15; H04W 40/22; H04W 76/14;
(Continued)

(56) References Cited

U.S. PATENT DOCUMENTS 10,595,354 B1 * 3/2020 Zhou ..................... H04W 88/04
11,490,448 B1 * 11/2022 Kuo ...................... H04W 76/27
(Continued)

FOREIGN PATENT DOCUMENTS

CN 118176817 A * 6/2024 ............. H04L 45/24
WO WO-2020184956 A1 * 9/2020 ............ H04W 76/34
WO WO-2021138511 A1 * 7/2021 ............ H04W 76/14

OTHER PUBLICATIONS

3GPP, "3rd Generation Partnership Project; Technical Specification Group Services and System Aspects; Study on Access Traffic Steering, Switching and Splitting support in the 5G system architecture (Release 16)," 3GPP TR 23.793 V0.7.0, Aug. 2018, 93 pages.

(Continued)

*Primary Examiner* — Julio R Perez
(74) *Attorney, Agent, or Firm* — Fish & Richardson P.C.

(57) ABSTRACT

One disclosure of the present specification provides a method by which a UE performs communication. The method may comprise the steps of: transmitting, to an SMF, a PDU session establishment request message; receiving a PDU session establishment accept message; transmitting a PDU session modification request message; and receiving a PDU session modification command message.

12 Claims, 22 Drawing Sheets

(58) Field of Classification Search
CPC ..... H04W 88/04; H04W 76/11; H04W 92/10; H04W 92/18
See application file for complete search history.

(56) References Cited

U.S. PATENT DOCUMENTS

| | | | | |
|---|---|---|---|---|
| 12,156,266 | B2 * | 11/2024 | Xu | H04W 76/15 |
| 2020/0178196 | A1 * | 6/2020 | Wang | H04W 60/005 |
| 2021/0007167 | A1 * | 1/2021 | Salkintzis | H04L 47/125 |
| 2021/0037585 | A1 * | 2/2021 | Youn | H04W 60/06 |
| 2023/0084233 | A1 * | 3/2023 | Pan | H04W 76/14 370/329 |
| 2023/0142957 | A1 * | 5/2023 | Paladugu | H04W 28/0226 370/329 |
| 2023/0247445 | A1 * | 8/2023 | Paladugu | H04W 76/14 370/315 |
| 2024/0348534 | A1 * | 10/2024 | Kim | H04W 76/15 |

OTHER PUBLICATIONS

Extended European Search Report in European Appln. No. 22842416.4, mailed on May 30, 2025, 9 pages.

* cited by examiner

FIG. 9

| Attribute | | Description | Comment |
|---|---|---|---|
| N4 Session ID | | Identifies the N4 session associated to this MAR | |
| Rule ID | | Unique identifier to identify this rule | |
| Steering functionality | | Indicates the applicable traffic steering functionality:<br>Values "MPTCP functionality", "ATSSS-LL functionality" | |
| Steering mode | | Values "Active-Standby", "Smallest Delay", "Load Balancing" or "Priority-based" | |
| Steering Mode Indicator | | Indicates either autonomous load-balance operation or UE-assistance operation if steering mode is set to "Load Balancing" | |
| Threshold values | | A Maximum RTT and/or a Maximum Packet Loss Rate | The Threshold Values are applied by UPF as described in clause 5.32.8. |
| Per-Access Forwarding Action information (NOTE 1) (NOTE 2) | Forwarding Action Rule ID | The Forwarding Action Rule ID identifies a forwarding action that has to be applied | |
| | Weight | Identifies the weight for the FAR if steering mode is "Load Balancing" | The weights for all FARs need to sum up to 100 |
| | Priority | Values "Active or Standby" or "High or Low" for the FAR | "Active or Standby" for "Active-Standby" steering mode and "High or Low" for "Priority-based" steering mode |
| | List of Usage Reporting Rule ID(s) | Every Usage Reporting Rule ID identifies a measurement action that has to be applied | This enables the SMF to request separate usage reports for different FARs (i.e. different accesses) |

NOTE 1: The Per-Access Fonvarding Action information is provided per access type (i.e. 3GPP access or Non-3GPP access)
NOTE 2: The Weight is treated as the default percentages if the Autonomous operation is allowed for the "Load Balancing" steering mode

MULTIPATH PDU SESSION

CROSS-REFERENCE TO RELATED APPLICATIONS

This application is a National Stage application under 35 U.S.C. § 371 of International Application No. PCT/KR2022/010105, filed on Jul. 12, 2022, which claims the benefit of Korean Patent Application No. 10-2021-0092394, filed on Jul. 14, 2021, Korean Patent Application No. 10-2021-0095947, filed on Jul. 21, 2021, and Korean Patent Application No. 10-2022-0025014, filed on Feb. 25, 2022. The disclosures of the prior applications are incorporated by reference in their entirety.

TECHNICAL FIELD

The present disclosure relates to mobile communication.

BACKGROUND

3rd generation partnership project (3GPP) long-term evolution (LTE) is a technology that enables high-speed packet communications. Many initiatives have been proposed for LTE goals, including those aimed at reducing user and provider costs, improving service quality, and expanding and improving coverage and system capacity, 3GPP LTE requires lower cost per bit, improved service availability, flexible use of frequency bands, simple structure, open interface, and proper power consumption of the terminal as upper-level requirements.

Work has begun at the International Telecommunication Union (ITU) and 3GPP to develop requirements and specifications for New Radio (NR) systems. 3GPP must identify and develop the technology components needed to successfully standardize a new Radio Access Technology (RAT) satisfying both urgent market needs and the long-term requirements determined in the ITU-R (International Mobile Telecommunications) international mobile telecommunications (IMT)-2020 process. In addition, NR must be able to use a spectral band in the range of at least 100 GHz that can be used for wireless communications even further into the future.

NR aims to be a single technology framework that covers all usage scenarios, requirements and deployment scenarios, including enhanced mobile broadband (eMBB), massive machine-type-communications (mMTC), ultra-reliable and low latency communications (URLLC), and more. NR may be essentially forward compatible.

Conventionally, communication over multiple paths, including a path through UE-to-Network Relay, for a single Protocol Data Unit (PDU) session has not been performed. It may be considered that a User Equipment (UE) is provided with services from the network over multiple paths, including a path through UE-to-Network Relay, for a single PDU session.

However, there is a problem that multiple paths between the UE and the network cannot be distinguished, because conventionally only one path is used for a single PDU session, either a path that does not go through UE-to-Network Relay or a path that goes through UE-to-Network Relay. For example, conventional Access and Mobility Function (AMF), Next Generation Radio Access Network (NG-RAN), Session Management Function (SMF), User Plane Function (UPF), etc. can distinguish between different UEs, but cannot distinguish between multiple paths for a single PDU session. Therefore, there are problems that AMF, NG-RAN, SMF, UPF, etc. cannot distinguish which paths information for a PDU session, N2 Session Management (SM) information, information for Quality of Service (QoS) flow, etc. is for.

SUMMARY

Accordingly, a disclosure of the present specification has been made in an effort to solve the aforementioned problem.

In order to solve the above problems, one disclosure of the present specification provides a method for a UE to perform communication. The method may include sending a PDU session establishment request message to the SMF; receiving a PDU session establishment acceptance message; transmitting a PDU session modification request message; and receiving a PDU session modification command message.

In order to solve the above problems, one disclosure of the present specification provides a UE for performing communications. The UE includes: at least one processor; and at least one memory storing instructions, operatively electrically coupled to said at least one processor, wherein said instructions are executed by said at least one processor: transmitting a PDU session establishment request message to the SMF; receiving a PDU session establishment acceptance message, transmitting a PDU session modification request message; and receiving a PDU session modification command message.

In order to solve the above problems, one disclosure of the present specification provides an apparatus in telecommunications. The apparatus includes: at least one processor; and at least one memory storing instructions, operatively electrically coupled to said at least one processor, wherein said instructions are executed by said at least one processor to perform operations including: generating a PDU session establishment request message to the SMF; obtaining a PDU session establishment acceptance message; generating a PDU session modification request message; and obtaining a PDU session modification command message.

In order to solve the above problems, one disclosure of the present specification provides a non-transitory computer-readable storage medium recording instructions. The instructions, when executed by one or more processors, may cause the one or more processors to: generate a PDU session establishment request message to the SMF; obtain a PDU session establishment acceptance message, generate a PDU session modification request message; and obtain a PDU session modification command message.

In order to solve the above problems, one disclosure of the present specification provides a method for an SMF to perform communication. The method may include: receiving a PDU session establishment request message; sending an N4 session establishment request message to the UPF; sending a PDU session establishment acceptance message; receiving a PDU session modification request message; sending an N4 session modification request message to the UPF; and sending a PDU session modification command message.

In order to solve the above problems, one disclosure of the present specification provides a UE for performing communications. The UE includes: at least one processor; and at least one memory storing instructions, operatively electrically coupled to said at least one processor, wherein said instructions are executed by said at least one processor; receiving a PDU session establishment request message; sending an N4 session establishment request message to the UPF; sending a PDU session establishment acceptance message; receiving a PDU session modification request message; sending an N4 session modification request message to the UPF; and sending a PDU session modification command message.

According to the present disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 9 illustrates an example of a Multi-Access Rule.

DETAILED DESCRIPTION

Figure 1:
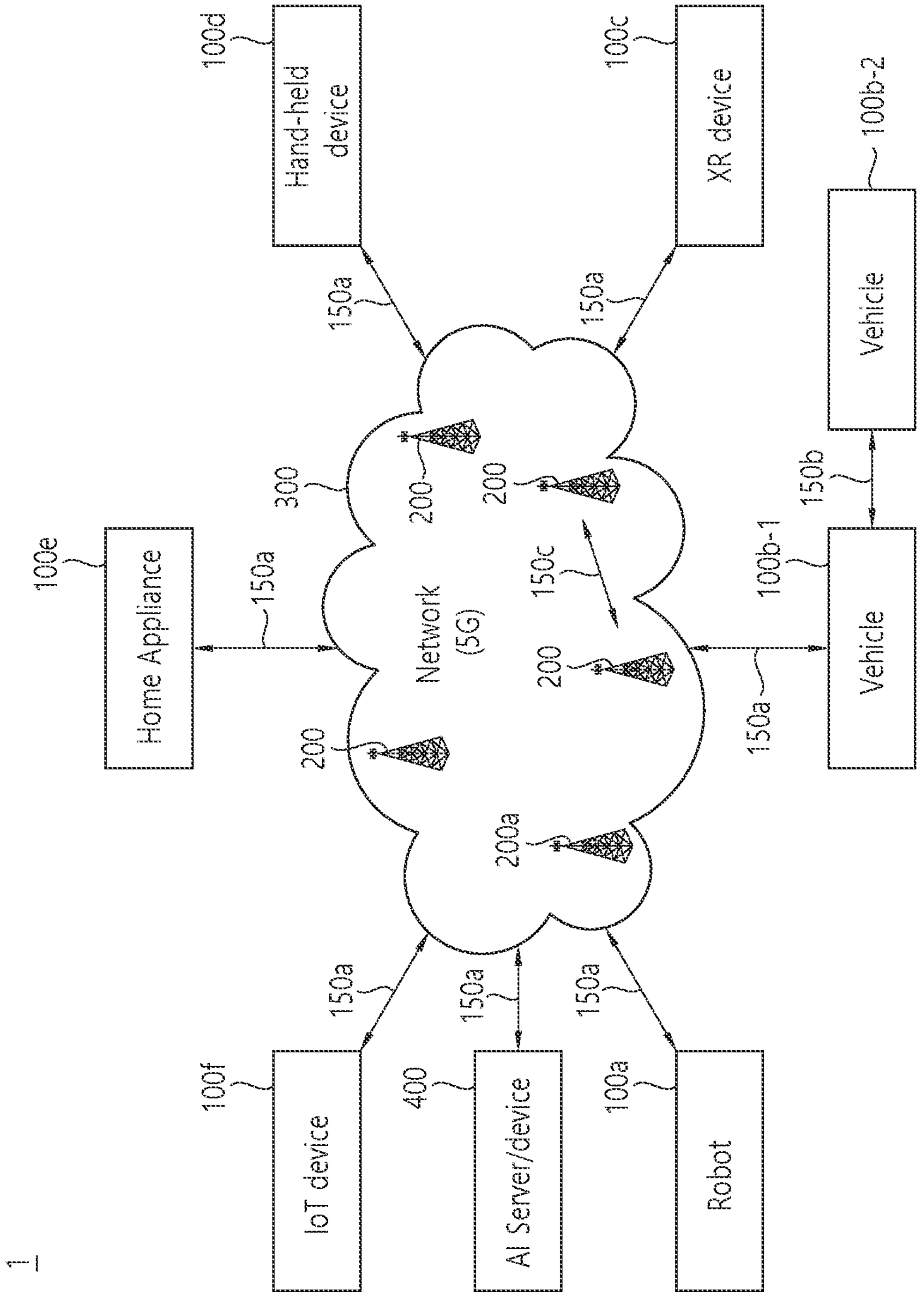
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA, 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A. B and C". In addition. "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

1. Techniques and Procedures Applicable to the Present Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally, and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally, and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
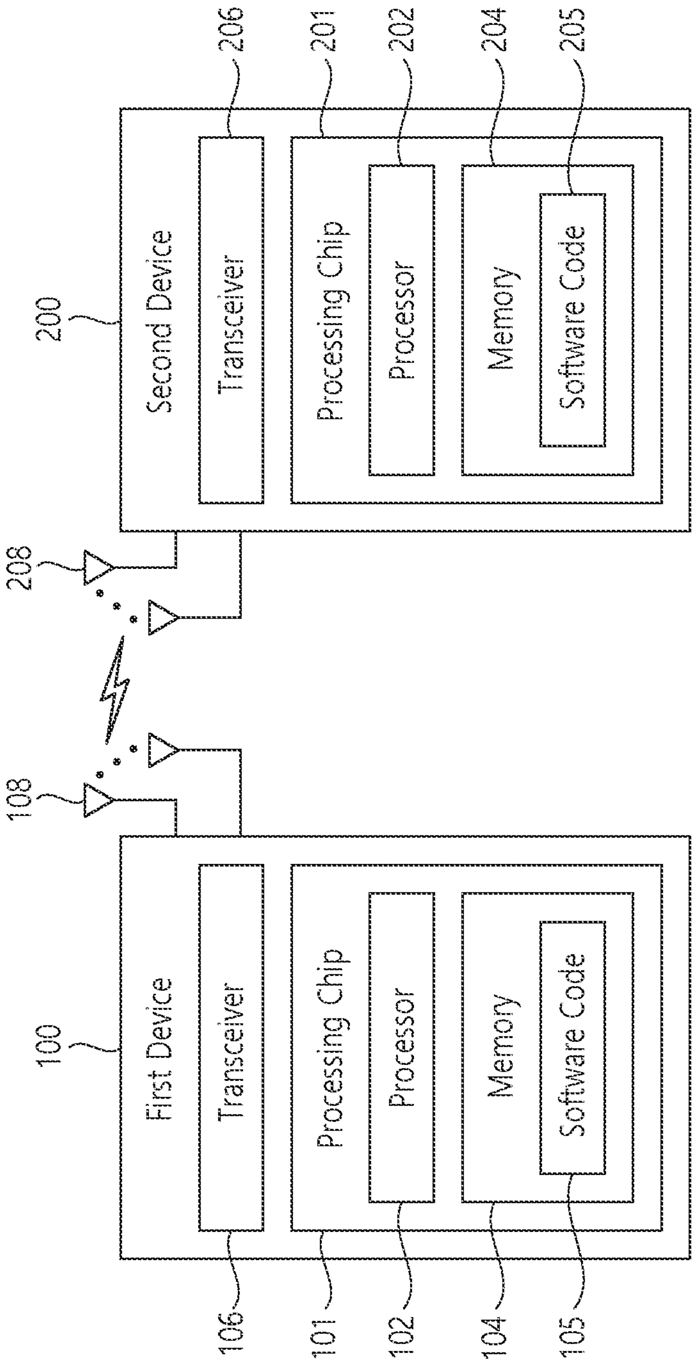
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) (or packet data units) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
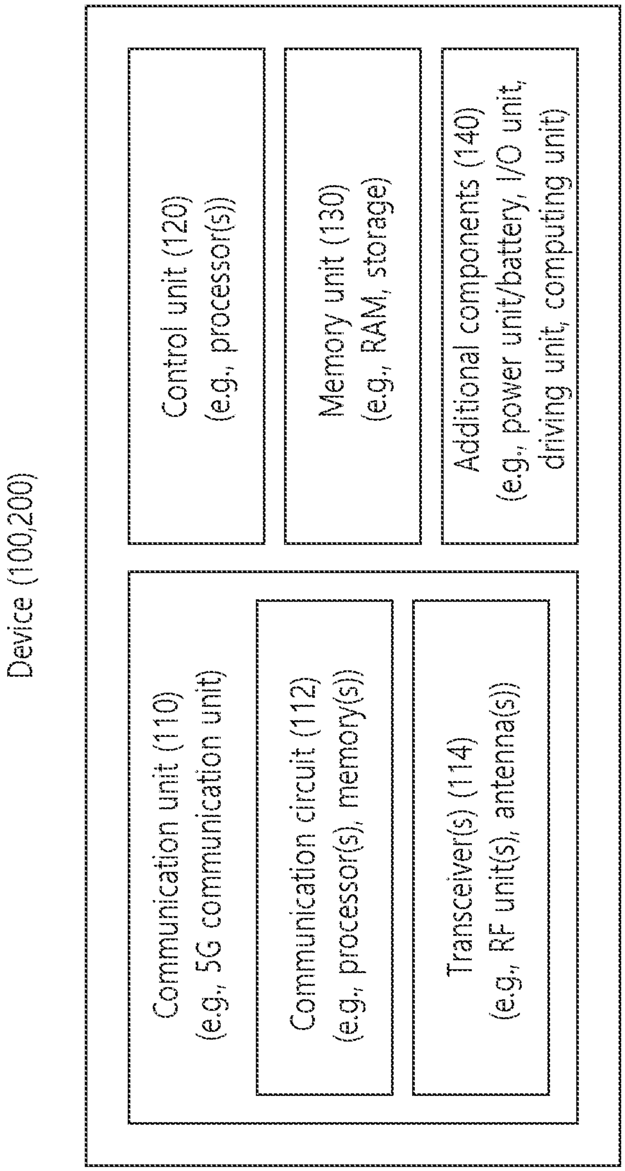
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
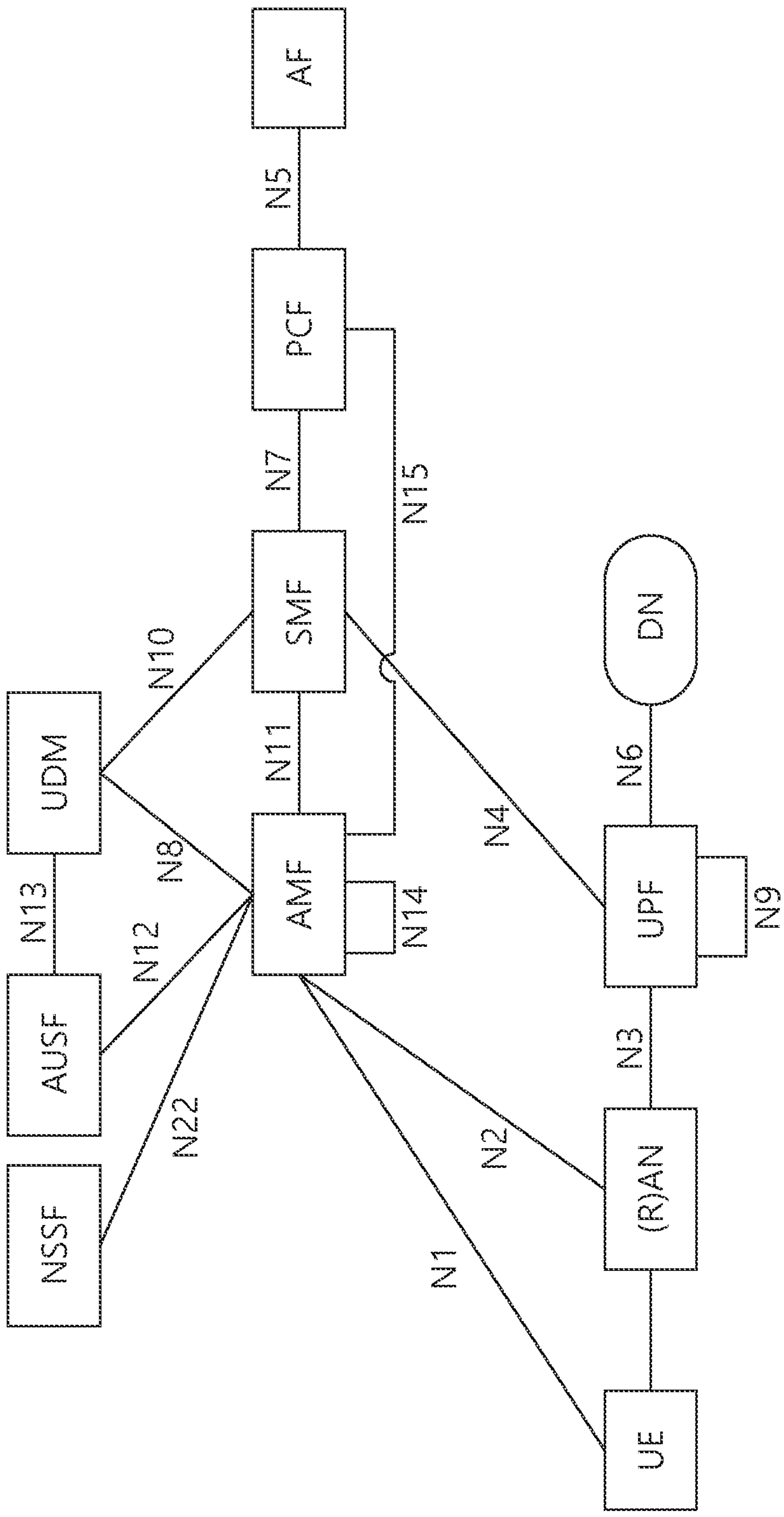
FIG. 4 shows an example of 5G system architecture to which implementations of the present disclosure is applied.

FIG. 4 shows an example of 5G system architecture to which implementations of the present disclosure is applied.

The 5G system (5GS) architecture consists of the following network functions (NF).

Authentication Server Function (AUSF)
Access and Mobility Management Function (AMF)
Data Network (DN), e.g., operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE)
(Radio) Access Network ((R)AN)
5G-Equipment Identity Register (5G-EIR)
Network Data Analytics Function (NWDAF)
CHarging Function (CHF)

Furthermore, the following network functions may be considered.

Non-3GPP InterWorking Function (N3IWF)
Trusted Non-3GPP Gateway Function (TNGF)
Wireline Access Gateway Function (W-AGF)

FIG. 4 depicts the 5G system architecture in the non-roaming case, using the reference point representation showing how various network functions interact with each other.

In FIG. 4, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 4. For clarity, the NWDAF and its connections with other NFs, e.g., PCF, are not depicted in FIG. 4.

The 5G system architecture contains the following reference points:

N1: Reference point between the UE and the AMF.
N2: Reference point between the (R)AN and the AMF.
N3: Reference point between the (R)AN and the UPF.
N4: Reference point between the SMF and the UPF.
N6: Reference point between the UPF and a Data Network.
N9: Reference point between two UPFs.

The following reference points show the interactions that exist between the NF services in the NFs.

N5: Reference point between the PCF and an AF.
N7: Reference point between the SMF and the PCF.
N8: Reference point between the UDM and the AMF.
N10: Reference point between the UDM and the SMF.
N11: Reference point between the AMF and the SMF.
N12: Reference point between the AMF and the AUSF.
N13: Reference point between the UDM and the AUSF.
N14: Reference point between two AMFs.
N15: represents a reference point between PCF and AMF, and a reference point between AMF and PCF of a visited network in a roaming scenario.
N16: Reference point between two SMFs, (in roaming case between SMF in the visited network and the SMF in the home network).
N22: Reference point between the AMF and the NSSF.
N30: Reference point between PCF and NEF.
N33: Reference point between AF and NEF.

In some cases, a couple of NFs may need to be associated with each other to serve a UE.

For reference, in FIG. 4, an AF by a third party other than an operator may be connected to 5GC through NEF.

Figure 5:
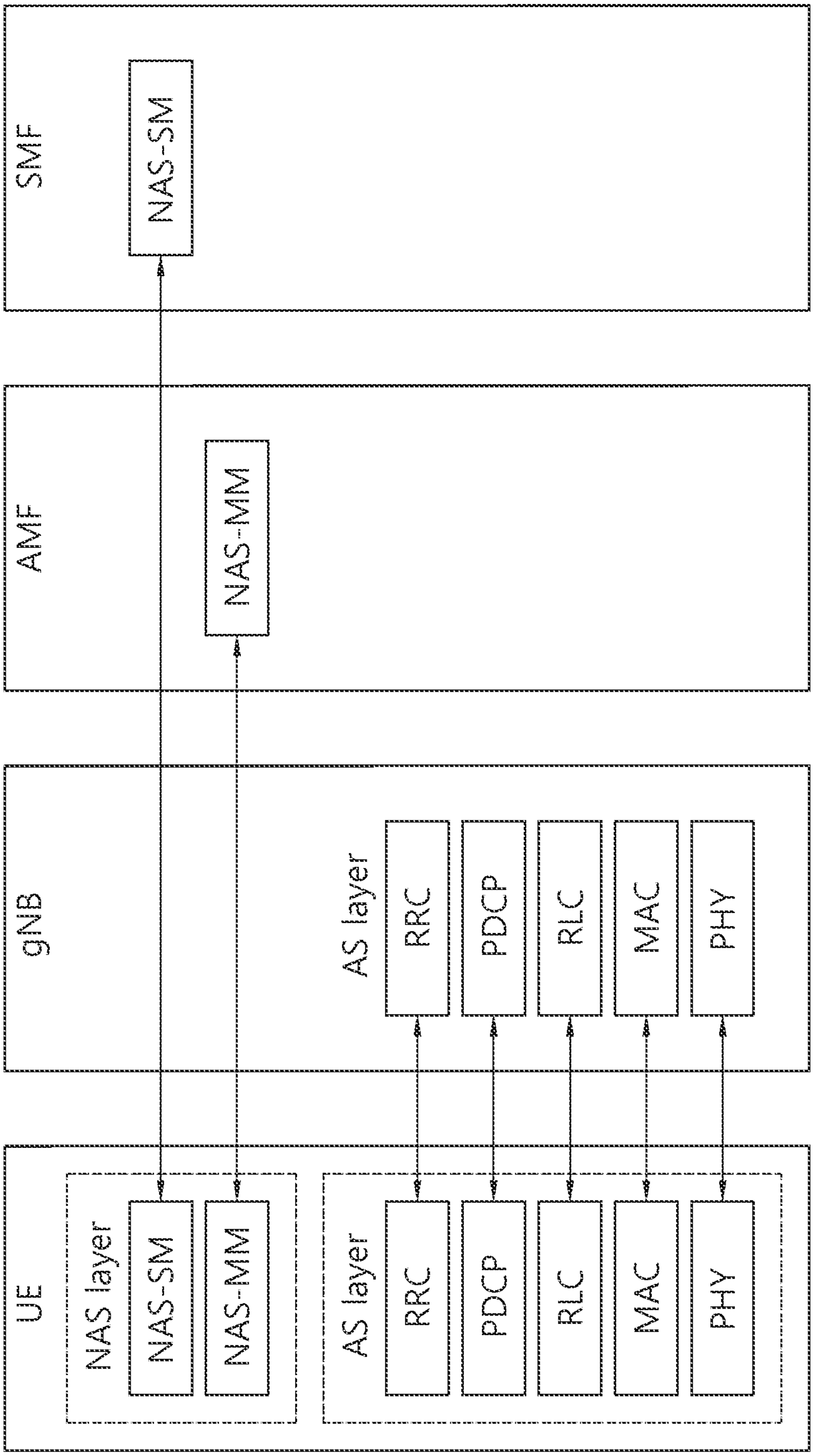
FIG. 5 is another exemplary diagram showing the structure of a radio interface protocol (Radio Interface Protocol) between the UE and the gNB.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case. RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.

Registration management and access management procedures. AMF supports the following functions.

Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an access stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<PDU Session Establishment Procedure>

A PDU session establishment procedure is described. Section 4.3.2 of 3GPP TS 23.502 V16.3.0 (2019-12) can be referred.

Figure 6A:
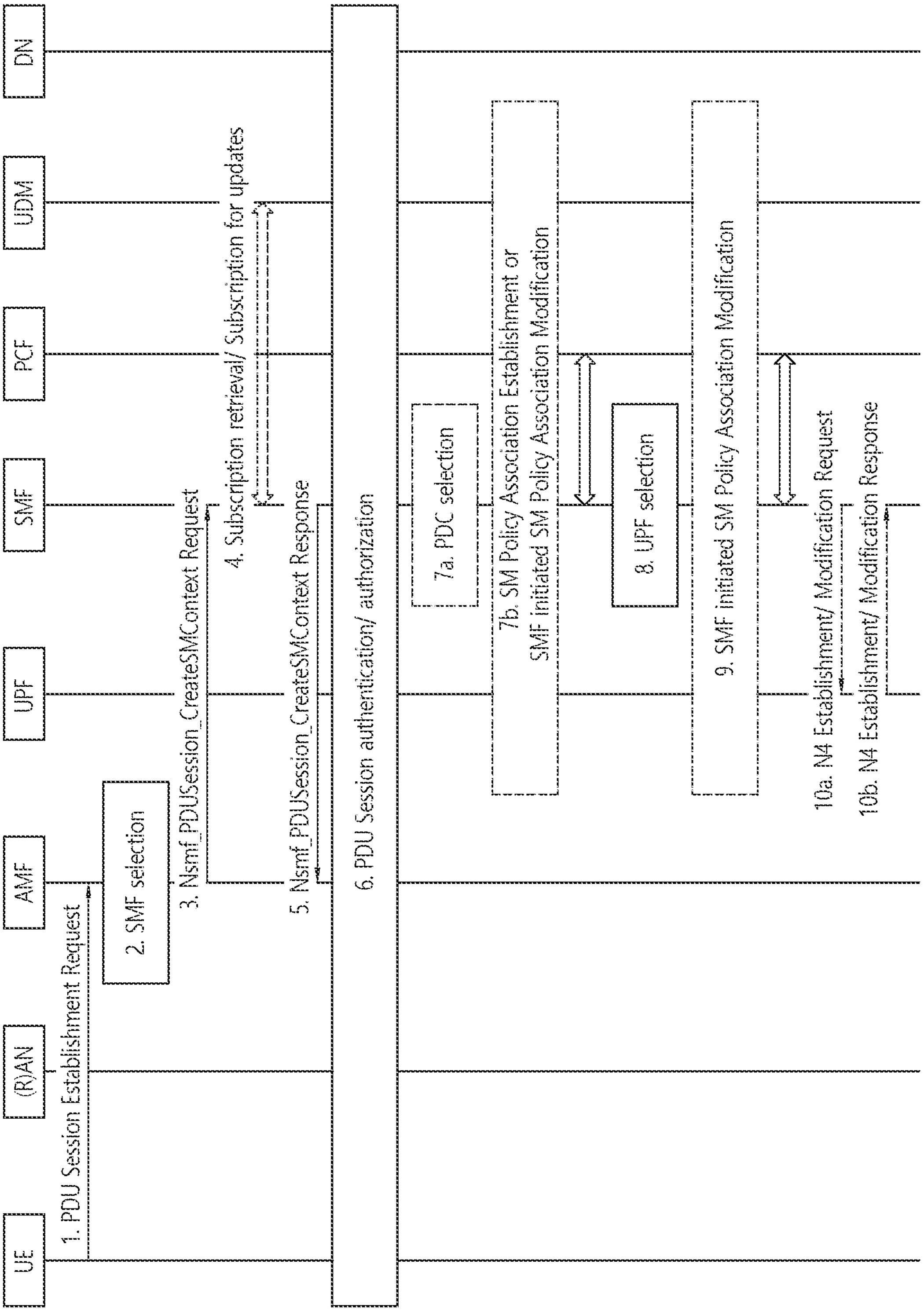
FIGS. 6*a* and 6*b* show an example of a PDU session establishment procedure to which implementations of the present disclosure is applied.
Figure 6B:
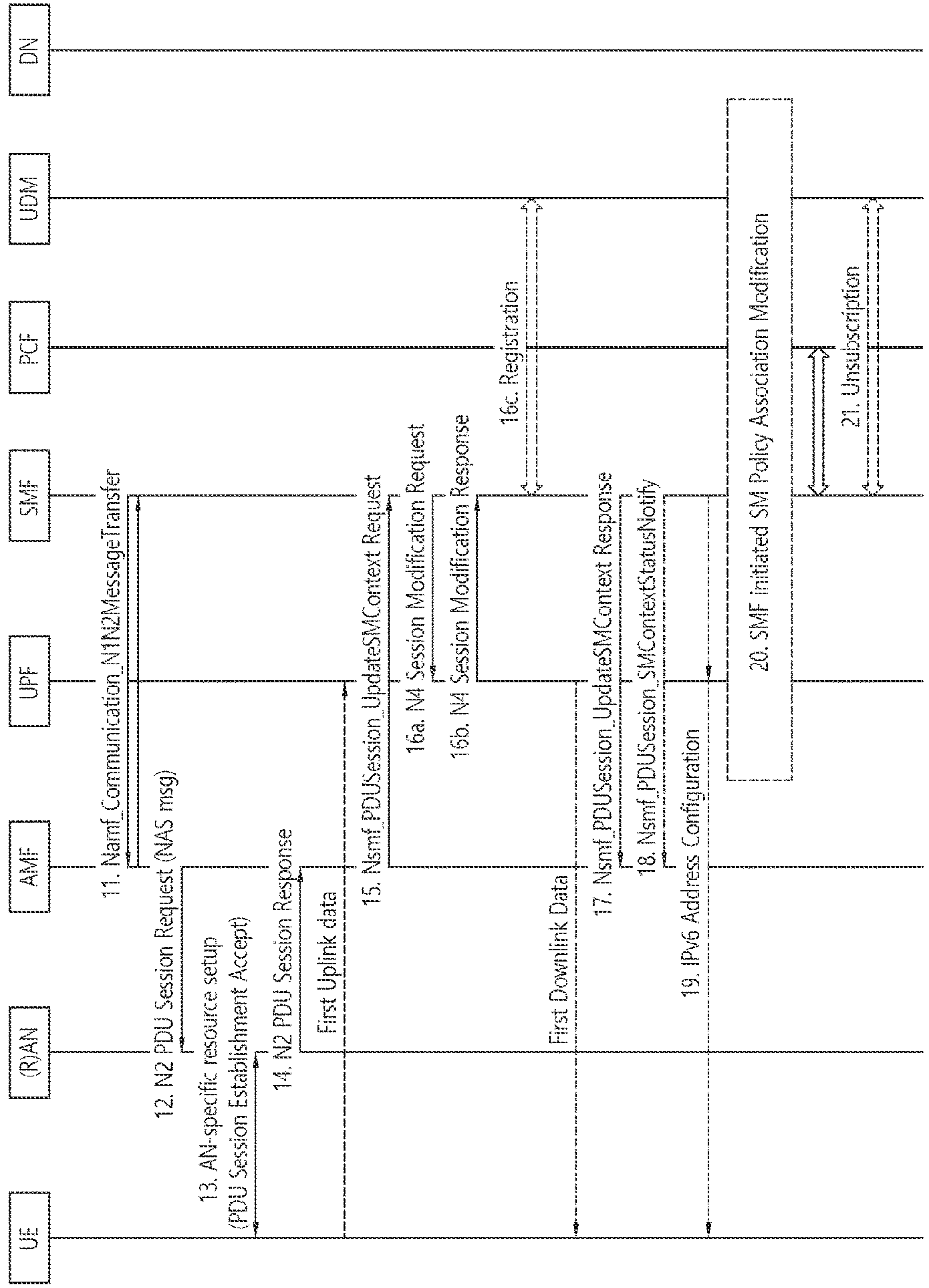

FIGS. 6*a* and 6*b* show an example of a PDU session establishment procedure to which implementations of the present disclosure is applied.

A PDU session establishment may correspond to:

a UE initiated PDU session establishment procedure.

a UE initiated PDU session handover between 3GPP and non-3GPP.

a UE initiated PDU session handover from EPS to 5GS.

a network triggered PDU session establishment procedure.

A PDU session may be associated either (a) with a single access type at a given time, i.e., either 3GPP access or non-3GPP access, or (b) simultaneously with multiple access types, i.e., one 3GPP access and one non-3GPP access. A PDU session associated with multiple access types is referred to as multi access PDU (MA PDU) session and it may be requested by access traffic steering, switching, splitting (ATSSS)-capable UEs.

FIGS. 6*a* and 6*b* specify the procedures for establishing PDU sessions associated with a single access type at a given time.

The procedure shown in FIGS. 6*a* and 6*b* assumes that the UE has already registered on the AMF thus unless the UE is emergency registered the AMF has already retrieved the user subscription data from the UDM.

(1) Step 1: In order to establish a new PDU session, the UE generates a new PDU session ID.

The UE initiates the UE requested PDU session establishment procedure by the transmission of a NAS message containing a PDU Session Establishment Request message within the N1 SM container. The PDU Session Establishment Request message includes a PDU session ID, Requested PDU Session Type, a Requested session and service continuity (SSC) mode, 5GSM Capability, protocol configuration options (PCO), SM PDU DN Request Container. UE Integrity Protection Maximum Data Rate, etc.

The Request Type indicates "Initial request" if the PDU session establishment is a request to establish a new PDU session and indicates "Existing PDU Session" if the request refers to an existing PDU session switching between 3GPP access and non-3GPP access or to a PDU session handover from an existing packet data network (PDN) connection in EPC. The Request Type indicates "Emergency Request" if the PDU session establishment is a request to establish a PDU session for emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The UE includes the S-NSSAI from the Allowed NSSAI of the current access type. If the Mapping of Allowed NSSAI was provided to the UE, the UE shall provide both the S-NSSAI of the visited PLMN (VPLMN) from the Allowed NSSAI and the corresponding S-NSSAI of the HPLMN from the Mapping Of Allowed NSSAI.

(2) Step 2: The AMF selects an SMF. If the Request Type indicates “Initial request” or the request is due to handover from EPS or from non-3GPP access serving by a different AMF, the AMF stores an association of the S-NSSAI(s), the data network name (DNN), the PDU session ID, the SMF ID as well as the Access Type of the PDU session.

If the Request Type is “initial request” and if the Old PDU session ID indicating the existing PDU session is also contained in the message, the AMF selects an SMF and stores an association of the new PDU Session ID, the S-NSSAI(s), the selected SMF ID as well as Access Type of the PDU Session.

If the Request Type indicates “Existing PDU Session”, the AMF selects the SMF based on SMF-ID received from UDM. The AMF updates the Access Type stored for the PDU session.

If the Request Type indicates “Existing PDU Session” referring to an existing PDU session moved between 3GPP access and non-3GPP access, then if the serving PLMN S-NSSAI of the PDU session is present in the Allowed NSSAI of the target access type, the PDU session establishment procedure can be performed in the following cases:

- the SMF ID corresponding to the PDU session ID and the AMF belong to the same PLMN;
- the SMF ID corresponding to the PDU session ID belongs to the HPLMN;

Otherwise the AMF shall reject the PDU session establishment request with an appropriate reject cause.

The AMF shall reject a request coming from an emergency registered UE and the Request Type indicates neither “Emergency Request” nor “Existing Emergency PDU Session”.

(3) Step 3: If the AMF does not have an association with an SMF for the PDU session ID provided by the UE (e.g., when Request Type indicates “initial request”), the AMF invokes Create SM Context Request procedure (e.g., Nsmf_PDUSession_CreateSMContext Request). If the AMF already has an association with an SMF for the PDU session ID provided by the UE (e.g., when Request Type indicates “existing PDU Session”), the AMF invokes Update SM Context Request procedure (e.g., Nsmf_PDUSession_UpdateSMContext Request).

The AMF sends the S-NSSAI of the serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE’s GUAMI which uniquely identifies the AMF serving the UE. The AMF forwards the PDU session ID together with the N1 SM container containing the PDU Session Establishment Request message received from the UE. The generic public subscription identifier (GPSI) shall be included if available at AMF.

The AMF provides the PEI instead of the SUPI when the UE in limited service state has registered for emergency services without providing a SUPI. In case the UE in limited service state has registered for Emergency services with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

The AMF may include a PCF ID in the Nsmf_PDUSession_CreateSMContext Request. This PCF ID identifies the home PCF (H-PCF) in the non-roaming case and the visited PCF (V-PCF) in the LBO roaming case.

(4) Step 4: If session management subscription data for corresponding SUPI, DNN and S-NSSAI of the HPLMN is not available, then SMF may retrieve the session management subscription data from the UDM and subscribes to be notified when this subscription data is modified.

(5) Step 5: The SMF transmits either Create SM Context Response message (e.g., Nsmf_PDUSession_CreateSMContext Response) or Update SM Context Response message (e.g., Nsmf_PDUSession_UpdateSMContext Response) to the AMF, depending on the request received in step 3.

If the SMF received Nsmf_PDUSession_CreateSMContext Request in step 3 and the SMF is able to process the PDU session establishment request, the SMF creates an SM context and responds to the AMF by providing an SM Context ID.

When the SMF decides to not accept to establish a PDU session, the SMF rejects the UE request via NAS SM signaling including a relevant SM rejection cause by responding to the AMF with Nsmf_PDUSession_CreateSMContext Response. The SMF also indicates to the AMF that the PDU session ID is to be considered as released, the SMF proceeds to step 20 below and the PDU session establishment procedure is stopped.

(6) Step 6: Optional secondary authentication/authorization may be performed.

(7*a*) Step 7*a*: if dynamic policy and charging control (PCC) is to be used for the PDU session, the SMF may perform PCF selection.

(7*b*) Step 7*b*: The SMF may perform an SM Policy Association Establishment procedure to establish an SM Policy association with the PCF and get the default PCC rules for the PDU session.

(8) Step 8: The SMF selects one or more UPFs.

(9) Step 9: The SMF may perform an SMF initiated SM Policy Association Modification procedure to provide information on the policy control request trigger condition(s) that have been met.

(10) Step 10: If Request Type indicates “initial request”, the SMF may initiate an N4 Session Establishment procedure with the selected UPF. Otherwise, the SMF may initiate an N4 Session Modification procedure with the selected UPF In step 10*a*, the SMF may send an N4 Session Establishment/Modification Request to the UPF and provides packet detection, enforcement and reporting rules to be installed on the UPF for this PDU session. In step 10*b*, the UPF may acknowledge by sending an N4 Session Establishment/Modification Response.

(11) Step 11: The SMF transmits a N1N2Message Transfer message (e.g., Namf_Communication_N1N2MessageTransfer) to the AMF.

The N1N2Message Transfer message may include N2 SM information. The N2 SM information carries information that the AMF shall forward to the (R)AN which may include:

- The CN Tunnel Info: Core network address(es) of the N3 tunnel corresponding to the PDU session;
- One or multiple quality of service (QoS) profiles and the corresponding QoS flow IDs (QFIs);
- The PDU session ID: indicate to the UE the association between (R)AN resources and a PDU session for the UE.
- S-NSSAI with the value for the serving PLMN (i.e., the HPLMN S-NSSAI or, in LBO roaming case, the VPLMN S-NSSAI).

User Plane Security Enforcement information determined by the SMF.

If the User Plane Security Enforcement information indicates that integrity protection is "Preferred" or "Required", the SMF also includes the UE Integrity Protection Maximum Data Rate as received in the PDU Session Establishment Request message.

Redundancy sequence number (RSN) parameter

The N1N2Message Transfer message may include N1 SM container. The N1 SM container contains the PDU Session Establishment Accept message that the AMF shall provide to the UE. The PDU Session Establishment Accept message includes S-NSSAI from the Allowed NSSAI. For LBO roaming scenario, the PDU Session Establishment Accept message includes the S-NSSAI from the Allowed NSSAI for the VPLMN and also it includes the corresponding S-NSSAI of the HPLMN from the Mapping Of Allowed NSSAI that SMF received in step 3.

Multiple QoS Rules, QoS flow level. QoS parameters if needed for the QoS Flow(s) associated with those QoS rule(s) and QoS Profiles may be included in the PDU Session Establishment Accept message within the N1 SM container and in the N2 SM information.

If the PDU session establishment failed anywhere between step 5 and step 11, then the N1N2Message Transfer message shall include the N1 SM container with a PDU Session Establishment Reject message and shall not include any N2 SM information. The (R)AN sends the NAS message containing the PDU Session Establishment Reject message to the UE. In this case, steps 12-17 are skipped.

(12) Step 12: The AMF sends the NAS message containing PDU Session ID and PDU Session Establishment Accept message targeted to the UE and the N2 SM information received from the SMF within the N2 PDU Session Request message to the (R)AN.

(13) Step 13: The (R)AN may issue AN specific signaling exchange with the UE that is related with the information received from SMF. For example, in case of a NG-RAN, an RRC connection reconfiguration may take place with the UE establishing the necessary NG-RAN resources related to the QoS rules for the PDU session request received in step 12.

The (R)AN forwards the NAS message (PDU Session ID, N1 SM container (PDU Session Establishment Accept message)) provided in step 12 to the UE. The (R)AN shall only provide the NAS message to the UE if the AN specific signaling exchange with the UE includes the (R)AN resource additions associated to the received N2 command.

If the N2 SM information is not included in the step 11, then the following steps 14 to 16*b* and step 17 are omitted.

(14) Step 14: The (R)AN transmits a N2 PDU Session Response message to the AMF. The N2 PDU Session Response message may include PDU session ID, Cause, N2 SM information (PDU Session ID, AN Tunnel Info, List of accepted/rejected QFI(s). User Plane Enforcement Policy Notification)), etc.

(15) Step 15: The AMF transmits an Update SM Context Request message (e.g., Nsmf_PDUSession_UpdateSMContext Request) to the SMF. The AMF forwards the N2 SM information received from (R)AN to the SMF.

(16*a*) Step S16*a*: The SMF initiates an N4 Session Modification procedure with the UPF. The SMF provides AN Tunnel Info to the UPF as well as the corresponding forwarding rules.

(16*b*) Step S16*b*: The UPF provides an N4 Session Modification Response to the SMF.

After this step, the UPF may deliver any DL packets to the UE that may have been buffered for this PDU session.

(16*c*) Step 16*c*: If the SMF has not yet registered for this PDU session, then the SMF may register with the UDM for a given PDU Session.

(17) Step 17: The SMF transmits an Update SM Context Response message (e.g., Nsmf_PDUSession_UpdateSMContext Response) to the AMF.

After this step, the AMF forwards relevant events subscribed by the SMF.

(18) Step 18: If during the procedure, any time after step 5, the PDU session establishment is not successful, the SMF may inform the AMF by invoking Nsmf_PDUSession_SMContextStatusNotify (Release). The SMF may also release any N4 session(s) created, any PDU session address if allocated (e.g., IP address) and release the association with PCF, if any. In this case, step 19 is skipped.

(19) Step 19: In the case of PDU Session Type IPv6 or IPv4v6, the SMF may generate an IPv6 Router Advertisement and send it to the UE.

(20) Step 20: The SMF may perform SMF initiated SM Policy Association Modification.

(21) Step 21: If the PDU Session establishment failed after step 4, the SMF may unsubscribe to the modifications of session management subscription data, if the SMF is no more handling a PDU session of the UE.

<UE-to-Network Relay>

Figure 7:
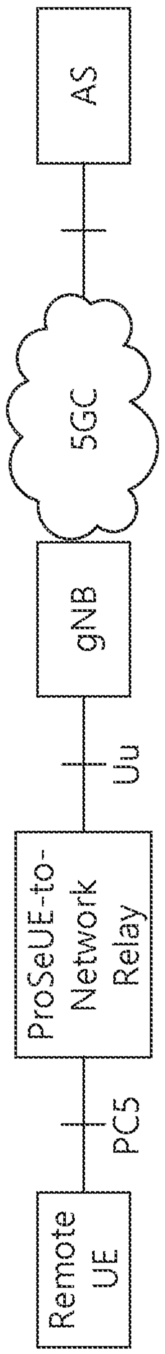
FIG. 7 shows an example of the architecture of a UE-to-Network Relay.

FIG. 7 shows an example of the architecture of a UE-to-Network Relay.

Referring to FIG. 7, UE-to-Network Relay supports the network connection of the Remote UE.

The PC5 link is the interface between the UE and the UE-to-network relay. The Uu link is the interface between the UE-to-network relay and the base station.

If the UE has established a PC5 link with the UE-to-network relay, the UE is considered as a remote UE.

The 5G ProSe UE-to-Network Relay entity (refer to 5G ProSe UE-to-Network Relay in FIG. 7) may provide a function for supporting network connectivity for Remote UEs. UE-to-Network Relay may be used for both public safety services and commercial services (eg, interactive services).

When a UE (eg Remote UE) has successfully established a PC5 link to a 5G ProSe UE-to-Network Relay, the UE (eg Remote UE) will be considered a Remote UE for a specific 5G ProSe UE-to-Network Relay. The Remote UE may be located within NG-RAN coverage or may be located outside NG-RAN coverage.

5G ProSe UE-to-Network Relay may relay unicast traffic (UL and DL traffic) between the Remote UE and the network. The 5G ProSe UE-to-Network Relay shall provide a general function to relay all IP traffic.

For unicast traffic between Remote UEs and 5G ProSe UE-to-Network Relays, One-to-one Direct Communication may be used.

II. Technology and Procedures Related to the Present Disclosure of the Present Specification The following describes techniques and procedures related to the present disclosure of the specification. Also described below are examples of problems that the present disclosure seeks to solve.

Proposals to support Proximity based Services (ProSe) in 5GS are being discussed. This includes receiving network connectivity services via UE-to-Network Relay, which may be Layer-2 UE-to-Network Relay or Layer-3 UE-to-Network Relay.

In the prior art, in order for a UE to be provided with service from the network for a given PDU session, the following scenario is assumed.

1) The UE may be provided with services from the network directly for a PDU session without communicating through UE-to-Network Relay (this is called Direct Network Communication or Direct Path).

2) A UE may be provided with services from the network indirectly for a PDU session through a single UE-to-Network Relay (this is called Indirect Network Communication or Indirect Path).

When a UE receives service from the network for a PDU session as described above, it may be interpreted that the UE is sending and receiving traffic over the PDU session.

It is not supported in the prior art for a UE to be provided with services from the network over multiple paths, including one or more indirect paths (i.e., paths that go through UE-to-Network Relay) for any PDU session.

However, it is considered in the present disclosure that a UE may be provided with service from the network for a PDU session over multiple paths. As an example of service over multiple paths, an example of receiving service for a PDU session over two paths will be described. FIGS. 8*a* to 8*d* illustrate a scenario in which a UE receives service from the network over two paths The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

Figure 8A:
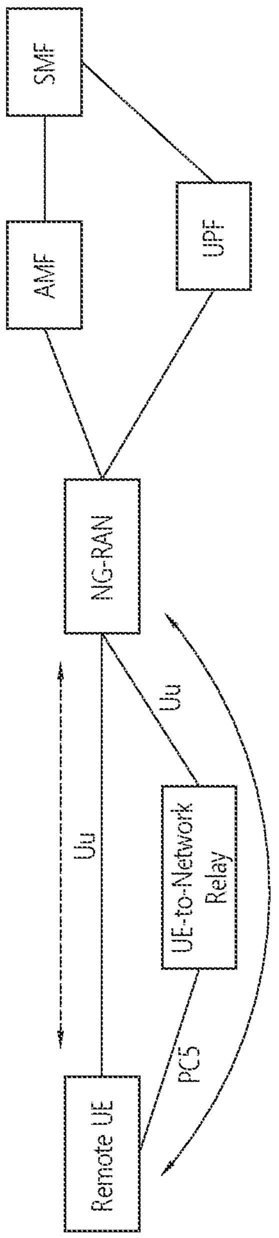
FIG. 8*a* illustrates a first example where services related to a PDU session are provided over two paths.
Figure 8B:
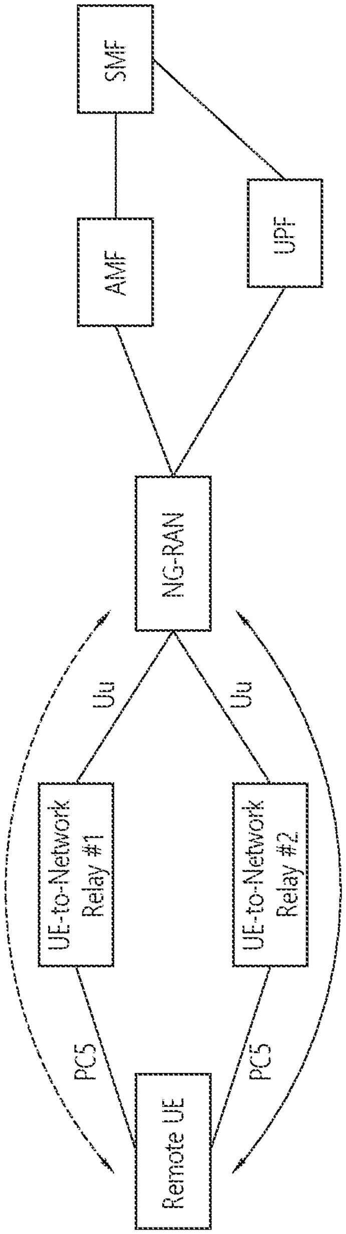
FIG. 8*b* illustrates a second example where services related to a PDU session are provided over two paths.
Figure 8C:
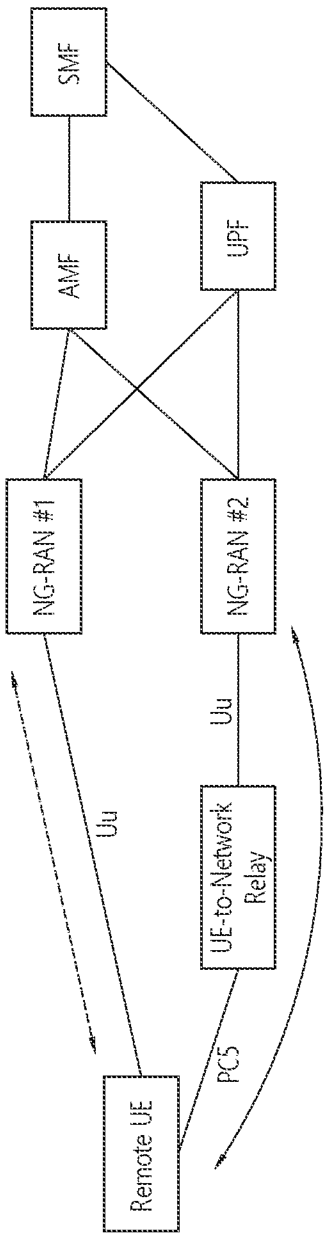
FIG. 8*c* illustrates a third example where services related to a PDU session are provided over two paths.
Figure 8D:
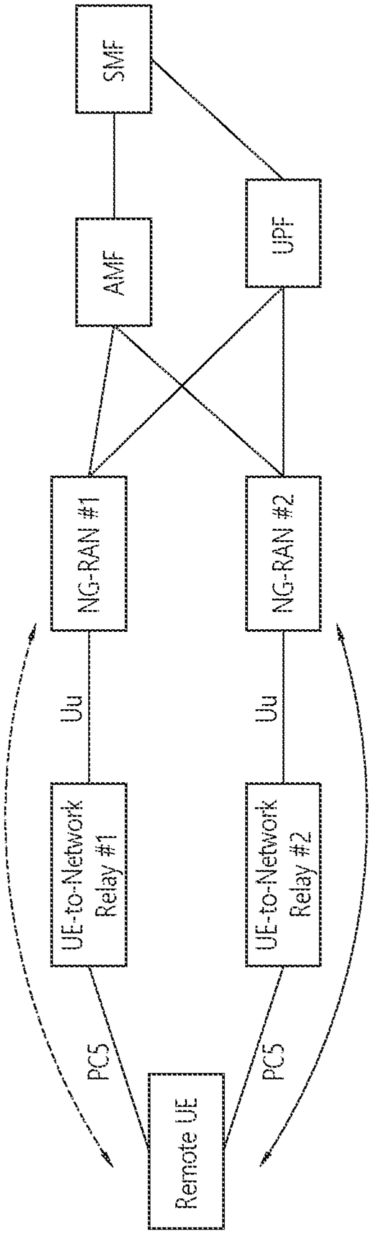
FIG. 8*d* illustrates a fourth example where services related to a PDU session are provided over two paths.

FIG. 8*a* illustrates a first example where services related to a PDU session are provided over two paths. FIG. 8*b* illustrates a second example where services related to a PDU session are provided over two paths. FIG. 8*c* illustrates a third example where services related to a PDU session are provided over two paths. FIG. 8*d* illustrates a fourth example where services related to a PDU session are provided over two paths.

In the example of FIG. 8*a*, a UE may be provided with services for a given PDU session from the network via a direct path and an indirect path. In this case, the paths may be serviced over the same NG-RAN.

In the example of FIG. 8*b*, a UE may be provided with service from the network for a given PDU session via two different indirect paths. In this case, the paths may be serviced over the same NG-RAN.

In the example of FIG. 8*c*, a UE may be provided with service for a PDU session from a network over a direct path and an indirect path. In this case, the paths may be serviced by different NG-RANs.

FIG. 8*d* shows that the UE may be provided with service from the network for a given PDU session via two different indirect paths. In this case, the paths may be serviced by different NG-RANs.

As shown in the examples in FIGS. 8*a* through 8*d*, for all paths, it is assumed that the connection/communication between the UE and the network along the path is 3GPP access (i.e., Uu interface), i.e., for direct paths, the connection/communication between the UE and the network may be established via 3GPP access. For the indirect path, the connection/communication between the UE-to-Network Relay and the network can be established via 3GPP access.

While the examples of FIGS. 8*a* to 8*b* illustrate two PATHs, they are illustrative only, and the scope of the MULTI-PATH described in the present disclosure herein may extend to three or more PATHs.

The examples of FIGS. 8*a* through 8*d* illustrate a UE being served for a single PDU session over the same PLMN. Alternatively, the UE may be served for a single PDU session over multiple paths through different PLMNs.

When a PDU Session is provided with network connectivity services through multiple paths as described above, we will refer to it as a Multi-Path PDU Session (MP PDU Session).

Multi-Path PDU Sessions can be assumed to be supported in both non-roaming and roaming cases. In addition, Multi-Path PDU Sessions can be assumed to be supported in both the local breakout and home routed cases when roaming.

According to the prior art 5GS technology, the SMF may provide information about the PDU Session to the NG-RAN via the AMF, such as information about the QoS Flow (including information such as QFI, QoS Profile, etc.) and CN Tunnel Info (or UL NG-U UP TNL Information). Referring to the example of FIG. 6*a* and FIG. 6*b*, which is one of the PDU Session Establishment procedures according to the prior art, in step 11, the SMF may transmit the following message (e.g., Namf_Communication_N1N2MessageTransfer) to the AMF. In this case, the N2 SM information in the message sent by the SMF includes information about the PDU Session:

For example, the SMF may send an N1N2 message transfer message (e.g., Namf_Communication_N1N2 Message Transfer) to the AMF, as shown in the following example:

Namf_Communication_N1N2MessageTransfer (PDU Session ID, N2 SM information (PDU Session ID, QFI(s), QoS Profile(s), CN Tunnel Info, S-NSSAI from the Allowed NSSAI, Session-AMBR. PDU Session Type, User Plane Security Enforcement information, UE Integrity Protection Maximum Data Rate, RSN, PDU Session Pair ID), N1 SM container (PDU Session Establishment Accept ([QoS Rule(s) and QoS Flow level QoS parameters if needed for the QoS Flow(s) associated with the QoS rule(s)], selected SSC mode, S-NSSAI(s), UE Requested DNN, allocated IPv4 address, interface identifier, Session-AMBR, selected PDU Session Type, [Reflective QoS Timer] (if available), [P-CSCF address(es)], [Control Plane Only indicator], [Header Compression Configuration], [Always-on PDU Session Granted]. [Small Data Rate Control parameters], [Small Data Rate Control Status], [Serving PLMN Rate Control]))).

In Step 12 of the example of FIG. 6*a* and FIG. 6*b*, the AMF may send the message N2 PDU Session Request (N2 SM information, NAS message (PDU Session ID, N1 SM container (PDU Session Establishment Accept)). [CN assisted RAN parameters tuning]) to the NG-RAN, including N2 SM information.

As shown in step 12 and step 14 of the examples of FIGS. 6*a* and 6*b* above, the AMF may use UE-associated signaling to send and receive UE-related messages to and from the NG-RAN. In such UE-related messages, the AMF and the NG-RAN may include identification information assigned to the UE. This enables the AMF and the NG-RAN to recognize to which UE a UE-associated message sent by the NG-RAN and the AMF, respectively, relates. The identification information may be one or more of an AMF UE NGAP ID and a RAN UE NGAP ID. Accordingly, the AMF and/or the NG-RAN may identify the UE-associated logical NG-connection using the identification information of one or more of the AMF UE NGAP ID and the RAN UE NGAP ID.

The following are examples of definitions for AMF UE NGAP ID and RAN UE NGAP ID.

RAN UE NGAP ID:

A RAN UE NGAP ID shall be allocated so as to uniquely identify the UE over the NG interface within an gNB. When an AMF receives an RAN UE NGAP ID it shall store it for the duration of the UE-associated logical NG-connection for this UE. Once known to an AMF this is included in all UE associated NGAP signalling.

The RAN UE NGAP ID must be unique within the logical NG-RAN node.

AMF UE NGAP ID:

An AMF UE NGAP ID shall be allocated so as to uniquely identify the UE over the NG interface within the AMF. When a NG-RAN node receives an AMF UE NGAP ID it shall store it for the duration of the UE-associated logical NG-connection for this UE. Once known to a NG-RAN node this ID is included in all UE associated NGAP signaling.

The AMF UE NGAP ID must be unique within the AMF set.

For example, a PDU SESSION RESOURCE SETUP REQUEST message may be used for step 12 in the example of FIGS. 6*a* and 6*b*. According to the message format extracted from the prior art 3GPP TS 38.413 V16.6.0, the message may include an AMF UE NGAP ID and a RAN UE NGAP ID, as shown in the example in Table 1 below.

TABLE 1

| IE/Group Name | Presence | Range | IE type and reference | Semantics description | Criticality | Assigned Criticality |
|---|---|---|---|---|---|---|
| Message Type | M | | 9.3.1.1 of 3GPP TS 38.413 V16.6.0 | | YES | reject |
| AMF UE NGAP ID | M | | 9.3.3.1 of 3GPP TS 38.413 V16.6.0 | | YES | reject |
| RAN UE NGAP ID | M | | 9.3.3.2 of 3GPP TS 38.413 V16.6.0 | | YES | reject |
| RAN Paging Priority | O | | 9.3.3.15 of 3GPP TS 38.413 V16.6.0 | | YES | ignore |
| NAS-PDU | O | | 9.3.3.4 of 3GPP TS 38.413 V16.6.0 | | YES | reject |
| PDU Session Resource Setup Request List | | 1 | | | YES | reject |
| >PDU Session Resource Setup Request Item | | 1 . . . <maxnoofPDUSessions> | | | — | |
| >>PDU Session ID | M | | 9.3.1.50 of 3GPP TS 38.413 V16.6.0 | | — | |
| >>PDU Session NAS-PDU | O | | NAS-PDU9.3.3.4 of 3GPP TS 38.413 V16.6.0 | | — | |
| >>S-NSSAI | M | | 9.3.1.24 of 3GPP TS 38.413 V16.6.0 | | — | |
| >>PDU Session Resource Setup Request Transfer | M | | OCTET STRING | Containing the PDU Session Resource Setup Request Transfer IE specified in subclause 9.3.4.1. of 3GPP TS 38.413 V16.6.0 | — | |
| UE Aggregate Maximum Bit Rate | O | | 9.3.1.58 of 3GPP TS 38.413 V16.6.0 | | YES | ignore |

In the example in Table 1, the numbers in the IE type and reference entries can refer to section numbers in 3GPP TS 38.413.

Table 1 shows an example of a PDU SESSION RESOURCE SETUP REQUEST message. This message is sent by the AMF and may be used to allocate resources in the Uu and NG-U to an NG-RAN node for one or more PDU session resources.

The AMF may send a PDU SESSION RESOURCE SETUP REQUEST message to the NG-RAN node.

Based on the N2 SM information transmitted by the SMF through the AMF, the NG-RAN may allocate/set the resources of the Uu and N3 (also known as NG-U) segments for the PDU session.

However, as shown in the example in FIG. 8*a* and the example in FIG. 8*b*, Multi-Path PDU Sessions may be serviced by the same NG-RAN.

Traditionally, communication over multiple paths for a single Protocol Data Unit (PDU) session has not been performed. It may be considered that a User Equipment (UE) receives services from the network over multiple paths for a single PDU session.

However, since only one path is traditionally used for a single PDU session, it is not possible to distinguish between multiple paths between the UE and the network. For example, conventional Access and Mobility Function (AMF), Next Generation Radio Access Network (NG-RAN), Session Management Function (SMF), User Plane Function (UPF), etc. can distinguish between different UEs, but cannot distinguish between multiple paths for a single PDU session. Therefore, there are problems that AMF, NG-RAN, SMF, UPF, etc. cannot distinguish which paths information for a PDU session. N2 Session Management (SM) information, information for Quality of Service (QoS) flow, etc. is for.

For example, according to the prior art, the NG-RAN may not distinguish which path the information about the PDU session corresponds to. For example, the NG-RAN may not distinguish between N2 SM information sent by an SMF, information about a PDU Session, or information about a QoS Flow.

In other words, according to the conventional 5GS technology, the SMF provides information about PDU Session (which is information about QoS Flow (QFI, QoS Profile, etc.) and CN Tunnel Info (or UL NG-U UP TNL Information, etc.) to the NG-RAN via AMF. UE-associated signaling is used when the AMF exchanges UE-related messages with the NG-RAN. By the AMF including the identification information (one or more of the AMF UE NGAP ID and the RAN UE NGAP ID) assigned to that UE, the AMF and the NG-RAN may recognize which UE the UE-related messages sent by the NG-RAN and the AMF, respectively, are for. The NG-RAN allocates/establishes the resources of the Uu and N3 (also known as NG-U) segments for the PDU Session based on the N2 SM information transmitted by the SMF through the AMF. However, if a Multi Path (MP) PDU Session is serviced by the same NG-RAN, the NG-RAN may not distinguish which path corresponds to the N2 SM information sent by the SMF or the information about the PDU Session or the information about the QoS Flow.

It is needed to solve these problems.

Note that in a Multi-Path PDU Session, the concept of a path can include not only the Uu segment but also the N3 segment. Also, in a Multi-Path PDU Session, the concept of a path might include the Uu segment, the N3 segment, and the N9 segment.

The present disclosure below proposes a method to address these issues.

III. The Present Disclosure of the Specification

The present disclosures described herein may be implemented in one or more combinations (e.g., combinations that include at least one of those described below). While each of the drawings illustrates an embodiment of each disclosure, the embodiments of the drawings may be implemented in combination with each other.

The present disclosures herein may comprise any combination of one or more of the actions/compositions/steps described below. The following methods described below may be performed or used combinatorially or complementarily.

The following methods are disclosed to address the various problems described above. The following methods may be performed or used combinatorially or complementarily.

In accordance with the present disclosure, a method to support a Multi-Path PDU Session may comprise a combination of one or more of the following behaviors/configurations/steps.

According to the present disclosure, a method to support Multi-Path PDU Sessions may assume that, for Indirect Network Communication, network connectivity services are obtained via Layer-2 UE-to-Network Relay. However, this is only an example, and the scope of the present disclosure is not limited thereby. For example, the present disclosure of the specification may be extended to include receiving network connectivity services via Layer-3 UE-to-Network Relay in the case of Indirect Network Communication.

In examples of the present disclosure, it is assumed that the path of the MP PDU session is over an NG-RAN (which may be a gNB only, or both a gNB and an ng-eNB). However, this is only an example, and the methods according to the present disclosure may also be applied to paths over non-3GPP access.

For indirect paths, the contents of the present disclosure may apply not only in the one-hop case (i.e., where the UE (or Remote UE) receives services from the network through a single UE-to-Network Relay), but also in the multi-hop case (i.e., where the UE (or Remote UE) receives services from the network through multiple UE-to-Network Relays).

In the present disclosure of the specification, user equipment (UE) and terminal may be used as a term with same meaning. Also, UE-to-Network Relay, ProSe UE-to-Network Relay, Relay, Relay UE, UE-NW Relay, 5G ProSe UE-to-Network Relay, 5G ProSe UE-to-NW Relay, 5G ProSe UE-to-Network Relay UE, and the like may be used as a same term. In addition, the terms Remote UE, 5G Remote UE, etc. may be described interchangeably.

In the present disclosure, reference is made primarily to 3GPP TS 23.304 V1.0.0 for Layer-2 UE-to-Network Relay related behavior and procedures.

Hereinafter, the present disclosure is described with reference to a first example to an eleventh example of the present disclosure. The first through eleventh examples of the present disclosure described herein may be implemented in combination. Of note, the eleventh example of the present disclosure may represent a specific embodiment based on a combination of at least one of the first to eleventh examples of the present disclosure.

1. The First Example of the Present Disclosure

The first example of the present disclosure describes an example of assigning and/or determining a Path ID.

Path ID can be used interchangeably with path number, path identifier, communication path ID, communication path number, communication path identifier, routing path ID, routing path number, routing path identifier, etc.

The Path ID assignment and/or determination behavior described below may always occur, or may occur when one or more of the following conditions are met.

At least one or all of the UE, NG-RAN, AMF, and SMF support multi-path.

At least one or all of the UE, NG-RAN, AMF, and SMF support Multi-Path PDU Session.

In the case of a UE, the UE may recognize that a Path ID assignment is required based on multi-path related policy information (e.g., ProSe policy, Multi-path policy, UE route selection policy (URSP), etc.) provisioned in the UE. The above multi-path related policies may be mapped/matched or associated with one or more of the following information: DNN, S-NSSAI, Application, ProSe service, Relay Service Code, etc.

In the case of a network, the network may find it necessary to assign a Path ID based on multi-path related subscriber information and/or multi-path related configuration information for the UE (e.g., ProSe policy, Multi-path policy, URSP, etc.). The above multi-path related information may be configured as mapped/matched or associated with one or more of the following information: DNN, S-NSSAI, Application. ProSe service, Relay Service Code, etc.

The operations of the UE determining that a Path ID assignment is required based on provisioned multi-path related policy information (e.g., ProSe policy, Multi-path policy, URSP, etc.) may be interpreted as the operations of the UE determining that a multi-path needs to be created.

For example, the UE's decision to create a multi-path may be due to the nature of the service/application traffic/application.

For example, if a particular service/application traffic/application in a UE's PDU session requires a high data rate/throughput, the UE may distribute the related traffic over multiple paths to transmit and receive. In such cases, the UE may decide that it is necessary to create a multi-path. In another example, if a particular service/application/application traffic in a PDU session requires high reliability or low error rate, the UE may redundantly transmit and receive the related traffic over multiple paths. In such cases, the UE may determine that it is necessary to create a multi-path.

In the above, the operation of assigning and/or determining a path ID may be interpreted as the operation of forming more than one path for the UE and/or the operation of forming an additional path in addition to the existing path for the UE.

The UE may form a new path (i.e. additional path) before performing any Session Management (SM) actions related to the PDU Session, due to a decision to create a PDU Session over an additional path, or due to a decision to create a Multi-Path PDU Session, or due to a decision to add a path to a created Multi-Path PDU Session. As a result, the UE may initiate discovery/selection of a new UE-to-Network Relay or initiate actions for direct path formation (e.g., cell/PLMN search/selection, etc.).

1-1. The First Example of the First Example of the Present Disclosure

The first example of the first example of the present disclosure describes an example in which a UE assigns and/or determines a path ID for a multi-path PDU session, and then provides the path ID to a network.

The UE may assign/determine a path ID for the new path and provide it to the network.

The UE may assign a Path ID in the same way as in the example below.

1) Whenever a UE connects to the network with a new path (or whenever a new path is formed, or whenever it wants to form a new path), the UE may assign a Path ID for both direct and indirect paths.

For example, in the case of FIGS. 8*a* and 8*c*, if the direct path is formed first, the direct path may be assigned Path #x and the indirect path may be assigned Path #x+1.

For example, in the case of FIGS. 8*a* and 8*c*, if the indirect path is formed first, the indirect path may be assigned Path #x and the direct path may be assigned Path #x+1.

For example, in the case of FIGS. 8*b* and 8*d* above, if the indirect path through UE-to-Network Relay #1 is formed first, then Path #x may be assigned to the indirect path through UE-to-Network Relay #1 and Path #x+1 to the indirect path through UE-to-Network Relay #2.

For example, in the case of FIGS. 8*b* and 8*d* above, if the indirect path through UE-to-Network Relay #2 is formed first, the indirect path through UE-to-Network Relay #2 may be assigned Path #x and the indirect path through UE-to-Network Relay #1 may be assigned Path #x+1.

2) It is also possible to assign a Path ID whenever a UE connects to the network with a new path (or whenever a new path is formed, or whenever it wants to form a new path) for indirect paths only.

For example, in the case of FIGS. 8*a* and 8*c*, the indirect path may be assigned Path #x.

For example, in the case of FIGS. 8*b* and 8*d*, if the indirect path through UE-to-Network Relay #1 is formed first, the indirect path through UE-to-Network Relay #1 may be assigned Path #x and the indirect path through UE-to-Network Relay #2 may be assigned Path #x+1.

For example, in the case of FIGS. 8*b* and 8*d*, if the indirect path through UE-to-Network Relay #2 is formed first, the indirect path through UE-to-Network Relay #2 may be assigned Path #x and the indirect path through UE-to-Network Relay #1 may be assigned Path #x+1.

3) For both direct and indirect paths, a UE may assign a Path ID whenever it connects to the network on a new path from the second path (or whenever a new path is formed from the second path, or whenever it wants to form a new path from the second path, or whenever it connects to the network on an additional path).

For example, in the case of FIGS. 8*a* and 8*c*, if the direct path is formed first, the direct path is not assigned a Path ID, and the indirect path may be assigned Path #x.

For example, in the case of FIGS. 8*a* and 8*c*, if the indirect path is formed first, the indirect path is not assigned a Path ID, and the direct path may be assigned Path #x.

For example, in FIGS. 8*b* and 8*d*, if the indirect path through UE-to-Network Relay #1 is formed first, the indirect path through UE-to-Network Relay #1 may not be assigned a Path ID, and the indirect path through UE-to-Network Relay #2 may be assigned Path #x.

For example, in FIGS. 8*b* and 8*d*, if the indirect path through UE-to-Network Relay #2 is formed first, the indirect path through UE-to-Network Relay #2 is not assigned a Path ID, and the indirect path through UE-to-Network Relay #1 may be assigned Path #x.

In 1) through 3) above, x can be a value of 0, 1, 2, etc. Similarly, path IDs can be numeric or textual.

The formation of new paths may also include NG-RAN changes and UE-to-Network Relay changes.

In one or more of the cases i) to iii) below, the UE may provide the assigned path ID to the network. The cases below may be performed in a combination or combination of cases. For example, the UE may send RRC messages, including NAS messages, to the network:

i) When the UE transmits an RRC message to the NG-RAN.

The RRC message may be a conventional message such as RRCSetupRequest, RRCSetupComplete, RRCReestablishmentRequest, etc. Alternatively, the RRC message may be a newly defined RRC message for the purpose of providing a path ID. Alternatively, the RRC message may be a newly defined RRC message for the purpose of adding/forming a path.

ii) The UE transmits a NAS message to the AMF.

The NAS message may be a conventional message such as a Registration Request, Service Request, etc. Alternatively, the NAS message may be a newly defined NAS message for the purpose of providing a path ID. Alternatively, the NAS message may be a newly defined NAS message for the purpose of adding/forming a path.

iii) When the UE transmits a NAS message to the SMF.

The NAS message may be a conventional message such as PDU Session Establishment Request, PDU Session Modification Request, etc. Alternatively, the NAS message may be a newly defined NAS message for the purpose of providing a path ID. Alternatively, the NAS message may be a newly defined NAS message for the purpose of adding/forming a path to a PDU Session. When the UE sends the SM NAS message to the SMF, the UE may additionally provide the path ID as a parameter that may be interpreted/understood by the AMF. Thus, if the UE sends a UL NAS Transport message to the AMF that includes an SM NAS message to be forwarded to the SMF, the UE may include the path ID in the UL NAS Transport message as well as the SM NAS message.

In examples i) through iii) above, when providing the path ID to the network, the UE may also provide additional information about the path.

For example, additional information about the path could be information about whether the UE may form a multi-path, information about whether the UE wants to form a multi-path, information about the path type (this could be information about whether the path is a direct path or an indirect path), information about the UE-to-Network Relay if the path is an indirect path (this could be identification information of the UE-to-Network Relay), information about other paths formed to date, etc.

Additional information about the path may be inferred by the network instead of being provided by the UE. In other words, even if the UE does not provide additional information about the path, the network may infer additional information about the path.

For example, in FIG. 8*a*, a UE may transmit an RRC message via UE-to-Network Relay. In this case, if the UE sends an RRC message over the UE-to-Network Relay and the RRC message includes path #y, the NG-RAN may recognize and store that path #y is an indirect path and that the path is via the UE-to-Network Relay. And the NG-RAN may provide additional information about the path to the AMF, such as the information that the path is an indirect path and the identification information of the UE-to-Network Relay. In this case, the NG-RAN may also provide the path ID to the AMF. The AMF may also provide the SMF with additional information about the path provided by the NG-RAN (which may also be provided with the path ID).

In addition, some of the additional information about the path may be provided by the UE and some may be inferred by the network.

When provided with a path ID and additional information about the path as described above, the network (e.g., one or more of NG-RAN, AMF, SMF) may store it. For example, the network (e.g., one or more of NG-RAN, AMF. SMF) may store all the necessary information about a particular path together in the UE context. The UE to which the path ID is assigned may also store all the necessary information about a particular path together.

The Path ID may change as the path(s) change or as one of the paths is released/removed. A path change may correspond to a change in path type (i.e., a path changes from a direct path to an indirect path, or an indirect path to a direct path), or a UE-to-Network Relay change on an indirect path. This description may be applied throughout the present disclosure of the specification.

Upon path change or path release/removal, the UE may notify the network (NG-RAN and/or 5GC). In this case, all or part of the information provided by the UE to the network when assigning the above path ID may be provided to the network. The UE may also provide information to the network indicating whether the path is being changed or released. In the case where a path is being formed/added, the UE may also provide information to the network indicating whether the path is being formed/added.

1-2. Second Example of the First Example of the Present Disclosure of the Specification The second example of the first example of the present disclosure describes an example in which the NG-RAN assigns and/or determines a path ID for a multi-path PDU session, and then provides the path ID to the UE and/or core network.

The NG-RAN may assign/determine a path ID for the new path and provide it to the UE and Core Network. The path ID may be assigned in the following form.

1) A Path ID may be assigned whenever the NG-RAN establishes anew path (or wants to establish a new path) with the UE for both direct and indirect paths.

For example, in FIG. 8*a*, if the direct path is formed first, the direct path may be assigned the NG-RAN's identification information+Path #x and the indirect path may be assigned the NG-RAN's identification information+Path #x+1. In contrast, if the indirect path is formed first, the indirect path may be assigned the NG-RAN's identification information+Path #x and the direct path may be assigned the NG-RAN's identification information+Path #x+1.

For example, in FIG. 8*b*, if the indirect path through UE-to-Network Relay #I is formed first, the indirect path through UE-to-Network Relay #1 may be assigned NG-RAN's identification information+Path #x and the indirect path through UE-to-Network Relay #2 may be assigned NG-RAN's identification information+Path #x+1. On the other hand, if the indirect path through UE-to-Network Relay #2 is formed first, the indirect path through UE-to-Network Relay #2 may be assigned NG-RAN's identification information+Path #x and the indirect path through UE-to-Network Relay #1 may be assigned NG-RAN's identification information+Path #x+1.

For example, in FIG. 8*c*, the direct path may be assigned NG-RAN #1's identification information+Path #x and the indirect path may be assigned NG-RAN #2's identification information+Path #y.

For example, in FIG. 8*d*, the indirect path through UE-to-Network Relay #1 may be assigned NG-RAN #1's identification information+Path #x, and the indirect path through UE-to-Network Relay #2 may be assigned NG-RAN #2's identification information+Path #y.

2) The NG-RAN may assign a Path ID whenever it forms a new path (or wants to form a new path) only for indirect paths with UEs.

For example, in FIG. 8*a*, the indirect path may be assigned the identification information of the NG-RAN+Path #x.

For example, in FIG. 8*b*, if the indirect path through UE-to-Network Relay #1 is formed first, the indirect path through UE-to-Network Relay #1 may be assigned NG-RAN's identification information+Path #x and the indirect path through UE-to-Network Relay #2 may be assigned NG-RAN's identification information+Path #x+1. On the other hand, if the indirect path through UE-to-Network Relay #2 is formed first, the indirect path through UE-to-Network Relay #2 may be assigned NG-RAN's identification information+Path #x and the indirect path through UE-to-Network Relay #1 may be assigned NG-RAN's identification information+Path #x+1.

For example, in FIG. 8*c*, the indirect path may be assigned the identification information of NG-RAN #2+Path #y.

For example, in FIG. 8*d*, the indirect path through UE-to-Network Relay #1 may be assigned NG-RAN #1's identification information+Path #x, and the indirect path through UE-to-Network Relay #2 may be assigned NG-RAN #2's identification information+Path #y.

3) The NG-RAN may assign a Path ID to a UE for both direct and indirect paths, whenever it forms a new path from the second path (or whenever it wants to form a new path from the second path, or whenever it forms an additional path).

For example, in FIG. 8*a*, if the direct path is formed first, the direct path is not assigned a Path ID, and the indirect path may be assigned the NG-RAN's identification information+Path #x. In contrast, if the indirect path is formed first, the indirect path is not assigned a Path ID, and the direct path may be assigned the NG-RAN's identification information+Path #x.

For example, in FIG. 8*b*, if the indirect path through UE-to-Network Relay #1 is formed first, the indirect path through UE-to-Network Relay #I is not assigned a Path ID, and the indirect path through UE-to-Network Relay #2 may be assigned the NG-RAN's identification information+Path #x. On the other hand, if the indirect path through UE-to-Network Relay #2 is formed first, the indirect path through UE-to-Network Relay #2 is not assigned a Path ID, and the indirect path through UE-to-Network Relay #1 may be assigned the NG-RAN's identification information+Path #x.

For example, in FIG. 8*c*, if the direct path is formed first, the direct path is not assigned a Path ID, and the indirect path may be assigned NG-RAN #2's identification information+Path #y. In contrast, if the indirect path is formed first, the indirect path is not assigned a Path ID, and the direct path may be assigned the identification information of NG-RAN #1+Path #x.

For example, in FIG. 8*d*, if the indirect path through UE-to-Network Relay #1 is formed first, the indirect path through UE-to-Network Relay #1 is not assigned a Path ID, and the indirect path through UE-to-Network Relay #2 may be assigned the identification information of NG-RAN #2+Path #y. On the other hand, if the indirect path through UE-to-Network Relay #2 is formed first, the indirect path through UE-to-Network Relay #2 is not assigned a Path ID, and the indirect path through UE-to-Network Relay #1 is assigned NG-RAN #1's identification information+Path #x.

In 1) through 3) above, x and y may be values such as 0, 1, 2, etc. The Path ID may be in the form of a number, or it may be in the form of text.

When the NG-RAN assigns a path ID, the NG-RAN may utilize assistance information provided by the UE.

For example, the assistance information provided by the UE could be information about how many paths the UE has formed, path type information (whether it is a direct or indirect path), etc.

The formation of new paths may also include NG-RAN changes and UE-to-Network Relay changes.

In one or more of the cases i) to iv) below, the NG-RAN may provide the assigned path ID to the UE and/or CN. The following cases may be performed in a combination or combination of cases:

i) The NG-RAN may provide the UE with a path ID when sending RRC messages to the UE.

The RRC message may be a conventional message such as RRCSetup, RRCReconfiguration, etc. Alternatively, the RRC message may be a newly defined RRC message for the purpose of providing a path ID. Alternatively, the RRC message may be a newly defined RRC message for the purpose of adding/forming a path.

ii) When the NG-RAN receives the NAS message from the UE, the NG-RAN may provide the path ID when forwarding the NAS message to the AMF.

If the NAS message includes an SM NAS message, the AMF may also provide the path ID provided by the NG-RAN to the SMF while forwarding the SM NAS message to the SMF.

iii) The NG-RAN may provide the path ID to the AMF.

The AMF may request the NG-RAN to provide a path ID and then the NG-RAN may provide the path ID, or the NG-RAN may provide the path ID without a request from the AMF.

The AMF may provide the path ID provided by the NG-RAN to the SMF. The AMF may provide the path ID to the SMF after the SMF requests the AMF to provide the path ID, or the AMF may provide the path ID to the SMF without a request from the SMF.

iv) The NG-RAN may provide the path ID to the SMF.

The NG-RAN may provide the path ID to the SMF after the SMF requests the NG-RAN to provide the path ID, or the NG-RAN may provide the path ID to the SMF without a request from the SMF.

In examples i) through iv) above, where the NG-RAN provides the path ID to the UE and CN, the NG-RAN may also provide additional information about the path.

For example, additional information about the path could be information about whether the NG-RAN may support multi-path, information about the path type (this could be information about whether it is a direct or indirect path), information about the UE-to-Network Relay if it is an indirect path (this could be identification information of the UE-to-Network Relay), information about other paths formed to date, etc.

Some of the additional information about the path may be provided by the UE, and some may be determined or inferred by the NG-RAN.

When the UE or CN (e.g., one or more of the AMF, SMF) is provided with the path ID and additional information about the path as described above, the UE and CN (e.g., one or more of the AMF, SMF) shall store it. The UE and CN (e.g. one or more of AMF, SMF) may store all the necessary information for a particular path together. The NG-RAN to which the path ID is assigned may also store all the necessary information for a specific path together.

1-3. Third Example of the First Example of the Present Disclosure of the Specification The third example of the first example of the present disclosure of the specification describes an example of an AMF assigning and/or determining a path ID and then providing the path ID to a UE, NG-RAN, SMF, etc.

The AMF may assign and/or determine a path ID for the new path and provide the path ID to one or more of the UE, NG-RAN, and SMF.

In the examples of FIGS. 8*a* to 8*d*, an example is shown where the same AMF serves multiple paths formed by the UE with the network. In such examples, the UE may form one path and then form and/or add a subsequent path. In this case, the UE may ensure that the same AMF is selected by sending an RRC message containing information about the serving AMF on the previously formed path (which may be information that may be used to identify the AMF, such as the 5G-GUTI assigned/provided by this AMF).

The AMF may assign a Path ID in the same way as the example below.

1) The AMF may assign a Path ID whenever it forms a new path (or wants to form a new path) with the UE for both direct and indirect paths.

For example, in FIGS. 8*a* and 8*c*, if the direct path is formed first, the direct path may be assigned Path #x and the indirect path may be assigned Path #x+1. In contrast, if the indirect path is formed first, the indirect path may be assigned Path #x and the direct path may be assigned Path #x+1.

For example, in FIGS. 8*b* and 8*d*, if the indirect path through UE-to-Network Relay #1 is formed first, the indirect path through UE-to-Network Relay #1 may be assigned Path #x and the indirect path through UE-to-Network Relay #2 may be assigned Path #x+1. In contrast, if the indirect path through UE-to-Network Relay #2 is formed first, the indirect path through UE-to-Network Relay #2 might be assigned Path #x and the indirect path through UE-to-Network Relay #1 might be assigned Path #x+1.

2) The AMF may assign a Path ID every time it forms a new path (or wants to form a new path) only for indirect paths with UEs.

For example, in the case of FIGS. 8*a* and 8*c*, the indirect path may be assigned Path #x.

For example, in FIGS. 8*b* and 8*d*, if the indirect path through UE-to-Network Relay #1 is formed first, the indirect path through UE-to-Network Relay #1 may be assigned Path #x and the indirect path through UE-to-Network Relay #2 may be assigned Path #x+1. In contrast, if the indirect path through UE-to-Network Relay #2 is formed first, the indirect path through UE-to-Network Relay #2 might be assigned Path #x and the indirect path through UE-to-Network Relay #1 might be assigned Path #x+l.

3) For both direct and indirect paths, the AMF may assign a Path ID to the UE whenever it forms a new path from the second path (or whenever it wants to form a new path from the second path, or whenever it forms an additional path).

For example, in FIGS. 8*a* and 8*c*, if the direct path is formed first, the direct path is not assigned a Path ID, and the indirect path may be assigned Path #x. In contrast, if the indirect path is formed first, the indirect path is not assigned a Path ID, and the direct path may be assigned Path #x.

For example, in FIGS. 8*b* and 8*d*, if the indirect path through UE-to-Network Relay #1 is formed first, the indirect path through UE-to-Network Relay #I is not assigned a Path ID, and the indirect path through UE-to-Network Relay #2 may be assigned Path #x. In contrast, if the indirect path through UE-to-Network Relay #2 is formed first, the indirect path through UE-to-Network Relay #2 is not assigned a Path ID and the indirect path through UE-to-Network Relay #1 may be assigned Path #x.

In 1) through 3) above, x and y may be values such as 0, 1, 2, etc. The Path ID may be in the form of a number, or it may be in the form of text.

When assigning a path ID, the AMF may utilize assistance information provided by the UE and/or assistance information provided by the NG-RAN.

For example, the assistance information provided by the UE could be information about whether the UE may form a multi-path, information about whether the UE wants to form a multi-path, information about the path type (this could be information about whether it is a direct path or an indirect path), information about the UE-to-Network Relay if it is an indirect path (this could be identification information of the UE-to-Network Relay), information about other paths formed to date, information about how many paths the UE has formed, and information about how many paths the UE has formed.

For example, the assistance information provided by the NG-RAN may be information about whether the NG-RAN may support multi-path, information about the path type (this may be information about whether the path is direct or indirect), information about the UE-to-Network Relay if it is indirect (this may be identification information of the UE-to-Network Relay), information about other paths formed by the UE, and information about how many paths this path is among the paths formed by the UE.

The formation of new paths may also include NG-RAN changes and UE-to-Network Relay changes.

In one or more of the cases i) to iii) below, the AMF may provide the assigned path ID to one or more of the UE, NG-RAN, and SMF. The following cases may be performed in combination or in a combined form:

i) When the AMF sends a NAS message to the UE, the AMF may provide the path ID to the UE and/or the NG-RAN.

The NAS message may be a conventional NAS message (e.g., MM NAS, SM NAS, etc.). Alternatively, the NAS message may be a newly defined NAS message for the purpose of providing a path ID. Alternatively, the NAS message may be a newly defined NAS message for the purpose of adding/forming a path.

The NAS message may also be a response to a NAS message sent by the UE.

The AMF sends N2 messages, including NAS messages, to the NG-RAN, and may provide the path ID as a parameter that may be interpreted/understood by the NG-RAN.

ii) The AMF may provide the path ID to the NG-RAN.

The AMF may include the path ID in the N2 message and provide it to the NG-RAN. The N2 message may be a conventional N2 message. Alternatively, the N2 message may be a newly defined N2 message for the purpose of providing a path ID. Alternatively, the N2 message may be a newly defined N2 message for the purpose of adding/forming a path.

iii) The AMF may provide the path ID to the SMF.

The AMF may provide the path ID to the SMF after the SMF requests the AMF to provide the path ID, or the AMF may provide the path ID to the SMF without a request from the SMF. The AMF may provide the path ID to the SMF when forwarding the SM NAS message sent by the UE to the SMF, or the AMF may send a message to the SMF to provide the path ID.

In examples i) through iii) above, when the AMF provides the path ID to the UE, NG-RAN, and SMF, it may also provide additional information about the path.

For example, additional information about the path could be information about whether the AMF may support multipath, path type information (this is information about whether it is a direct or indirect path), information about the UE-to-Network Relay if it is an indirect path (this could be identification information for the UE-to-Network Relay), information about other paths formed to date, NG-RAN identification information, etc.

Some of the additional information about the path may be provided by the UE and/or the NG-RAN, and some may be determined or inferred by the AMF.

When provided with a path ID and additional information about the path as described above, one or more of the UE, NG-RAN, and SMF may store it. For example, one or more of the UE, NG-RAN, and SMF may store all the necessary information for a particular path together. The AMF, which assigned the path ID, may also store all the necessary information for a particular path together.

1-4. Fourth Example of the First Example of the Present Disclosure of the Specification The fourth example of the first example of the present disclosure of the specification describes an example where the SMF assigns and/or determines a Path ID for a multi-path PDU session and provides it to the UE, NG-RAN, and AMF.

After the SMF has assigned and/or determined the path ID for the new path of the PDU Session, it may provide the path ID to one or more of the UE. NG-RAN, and AMF. This may only be done if the PDU Session is a Multi-Path PDU Session.

When the UE requests the SMF to create (or establish) a PDU session, the MP PDU session may be created by the UE including information in the request message indicating that it is an MP PDU session. Alternatively, an MP PDU Session may be created by the SMF deciding to create an MP PDU Session in response to a request to create a PDU Session made by the UE.

Alternatively, a normal PDU session may be changed to an MP PDU session when the PDU Session Modification procedure is performed.

The SMF may assign a Path ID in the same way as the example below.

1) When an MP PDU Session is created, or when a new path is added to an MP PDU Session, or when a regular PDU Session is changed to an MP PDU Session, regardless of whether it is a direct or indirect path (i.e., for both), the SMF may assign a Path ID at the time the new path is formed, added, and/or recognized.

For example, in FIG. 8*a* and FIG. 8*c*, if the direct path is formed/added first, the direct path may be assigned Path #x and the indirect path may be assigned Path #x+1. In contrast, if the indirect path is formed/added first, the indirect path may be assigned Path #x and the direct path may be assigned Path #x+1.

For example, in FIGS. 8*b* and 8*d*, if the indirect path through UE-to-Network Relay #1 is formed/added first, the indirect path through UE-to-Network Relay #I may be assigned Path #x and the indirect path through UE-to-Network Relay #2 may be assigned Path #x+1. In contrast, if the indirect path through UE-to-Network Relay #2 is created/added first, the indirect path through UE-to-Network Relay #2 may be assigned Path #x and the indirect path through UE-to-Network Relay #1 may be assigned Path #x+1.

In another example, in FIG. 8*a* through FIG. 8*d*, if an MP PDU Session is formed after both paths are formed, Path #x may be assigned for one of the paths and Path #x+1 for the other of the two paths.

2) When an MP PDU Session is created, or when a new path is added to an MP PDU Session, or when a regular PDU Session is changed to an MP PDU Session, the SMF may assign a Path ID at the time of new path formation/addition/recognition (when a new path is formed, added, and/or recognized) for indirect paths only.

For example, in the case of FIGS. 8*a* and 8*c*, the indirect path may be assigned Path #x.

For example, in FIGS. 8*b* and 8*d*, if the indirect path through UE-to-Network Relay #1 is formed/added first, the indirect path through UE-to-Network Relay #1 may be assigned Path #x and the indirect path through UE-to-Network Relay #2 may be assigned Path #x+1. In contrast, if the indirect path through UE-to-Network Relay #2 is created/added first, the indirect path through UE-to-Network Relay #2 may be assigned Path #x and the indirect path through UE-to-Network Relay #1 may be assigned Path #x+1.

As another example, in FIGS. 8*b* and 8*d*, if an MP PDU Session is formed after both paths are formed, Path #x may be assigned for one of the paths and Path #x+1 for the other of the two paths.

3) When a second or more paths are formed/added/recognized (when a second or more paths are formed, added, and/or recognized) for an MP PDU Session, regardless of whether they are direct or indirect paths, the SMF may assign a Path ID.

In 1) through 3) above, x and y may be values such as 0, 1, 2, etc. The Path ID may be a number, or it may also be text.

When assigning the path ID, the SMF may utilize one or more of the following: assistance information provided by the UE, assistance information provided by the NG-RAN, and assistance information provided by the AMF.

For example, the assistance information provided by the UE may include information about whether the UE is able to form a multi-path, information about whether the UE wants to form a multi-path, information about whether the UE supports MP PDU Session, and information about whether the UE is requesting the creation of an MP PDU Session, information about the path type of the path being formed/added in connection with the MP PDU Session (this may be information about whether it is a direct or indirect path), information about the UE-to-Network Relay if it is an indirect path (this may be identification information of the UE-to-Network Relay), information about other paths formed to date, information about the number of paths formed by the UE, etc.

For example, the assistance information provided by the NG-RAN may include information about whether the NG-RAN may support multi-path, information about whether the NG-RAN supports MP PDU sessions, path type information about whether the NG-RAN received the NAS message (which is an RRC message containing a NAS message) from the UE via a direct path or via an indirect path, If received via indirect path, information about the UE-to-Network Relay (this may be the identification information of the UE-to-Network Relay), information about other paths formed by the UE, and information about how many paths this path is among the paths formed by the UE.

For example, the assistance information provided by the AMF may be information about whether the AMF may support multi-path, path type information about whether the AMF supports MP PDU sessions, information about whether the AMF received the NAS message from the UE over a direct path or an indirect path, information about the UE-to-Network Relay if it was received over an indirect path (which may be the identification information of the UE-to-Network Relay), information about other paths formed by the UE, and information about how many paths this path is among those formed by the UE.

The NG-RAN may provide the assistance information provided by the UE to the AMF as is, or the NG-RAN may modify the assistance information provided by the UE and provide it to the AMF. The AMF may provide the assistance information provided by the UE or the NG-RAN to the SMF as is or with modifications.

The formation of new paths may also include NG-RAN changes and UE-to-Network Relay changes.

In one or more of i) through iii) below, the SMF may provide the assigned path ID to one or more of the UE, NG-RAN, and AMF. The following cases may be performed in a combination or combination of cases.

i) When the SMF sends NAS messages to the UE, it may provide the path ID to the UE and/or AMF.

The NAS message may be a conventional NAS message. Alternatively, the NAS message may be a newly defined NAS message for the purpose of providing a path ID. Alternatively, the NAS message may be a newly defined NAS message for the purpose of adding/forming a path.

The NAS message may also be a response to a NAS message sent by the UE.

The SMF may transmit messages including NAS messages (e.g., Namf_Communication_N1N2MessageTransfer) to the AMF, and may provide a path ID as a parameter that the AMF may interpret/understand.

The AMF may also include the path ID when sending N2 messages to the NG-RAN, including NAS messages sent by the SMF above.

ii) The SMF may provide the path ID to the AMF.

The SMF may provide a path ID after the AMF requests the SMF to provide a path ID, or the SMF may provide a path ID without a request from the AMF.

iii) The SMF may provide the path ID to the NG-RAN.

The SMF may provide path IDs to the NG-RAN via AMF. The message used by the SMF may be an existing message, a newly defined message for the purpose of providing a path ID, or a newly defined message for the purpose of adding/forming a path.

In examples i) through iii) above, when the SMF provides the Path ID to the UE, NG-RAN, and AMF, it may also provide additional information about the path.

For example, additional information about the path could be information about whether the SMF may support multi-path, information about whether the SMF may support MP PDU sessions, information about the path type of the path to be formed/added for the MP PDU session (whether it is a direct path or an indirect path), information about the UE-to-Network Relay if it is an indirect path (this could be identifying information of the UE-to-Network Relay), information about other paths formed for MP PDU sessions to date, etc.

Some of the additional information about the path may be provided by one or more of the UE, NG-RAN, AMF, and some may be determined or inferred by the SMF.

When provided with a path ID and additional information about the path as described above, one or more of the UE. NG-RAN and AMF may store it. For example, one or more of the UE, the NG-RAN, and the AMF may store together all the necessary information about a particular path in relation to a PDU session. The SMF that assigned the path ID may also store all the necessary information about a particular path in relation to a PDU session.

2. The Second Example of the Present Disclosure of the Specification

A second example of the present disclosure describes an example of forming and/or creating a multi-path PDU session.

An MP PDU session may be created by the UE requesting the SMF to create a PDU session and including information indicating that it is an MP PDU session (or requesting an MP PDU session). Alternatively, an MP PDU Session may be created by the SMF determining to create an MP PDU Session in response to a request to create a PDU Session made by the UE.

For example, an MP PDU session may be created by the UE sending a PDU session establishment request message to the SMF including information indicating that it is an MP PDU session. Alternatively, an MP PDU session may be created by the UE sending a PDU session establishment request message to the SMF and the SMF deciding to create an MP PDU session.

Alternatively, a normal PDU session may be changed to an MP PDU session during the PDU session modification procedure. For example, when the UE requests a PDU Session change to the SMF, a normal PDU Session may be changed to an MP PDU Session by sending a PDU Session Modification Request message containing information indicating that it is an MP PDU Session (or information requesting an MP PDU Session). For example, in response to a PDU Session Modification Request requested by the UE, an MP PDU Session may be created by the SMF deciding to change to an MP PDU Session. For example, a PDU Session Modification procedure may be initiated by the SMF determining that a normal PDU Session is to be changed to an MP PDU Session.

Alternatively, a normal PDU session may be changed to an MP PDU session by performing the action of adding a path to the normal PDU session. The action to add a path may be UE initiated or SMF initiated.

The UE may include information indicating that it is an MP PDU Session (or information requesting an MP PDU Session) in the SM NAS message as well as in MM NAS messages (e.g., UL NAS Transport) including the SM NAS message, so that the AMF knows that the SM NAS message is a request for an MP PDU Session. The UE may also include information indicating that it is an MP PDU Session (or requesting an MP PDU Session) in an additional RRC message to make the NG-RAN aware that the NAS message is requesting an MP PDU Session.

The UE may form multiple paths with the network and add multiple paths at once when creating an MP PDU Session, or it may create an MP PDU Session for one path and then add another path to the created MP PDU Session. In the latter case, the UE may send an SM NAS message to request to add a path to the created MP PDU session. When the UE sends the SM NAS message, it may include the PDU Session ID of the generated MP PDU Session in a parameter part that can be interpreted/understood by the AMF (e.g., in a UL NAS Transport message), thereby enabling the AMF to select/determine the SMF serving said MP PDU Session.

3. The Third Example of the Present Disclosure of the Specification

The third example of the present disclosure of the specification describes an example in which the SMF provides PDU session related information of a Multi-Path PDU Session to the NG-RAN.

When an MP PDU Session is generated or modified, or when a QoS Flow is added/changed/removed from an MP PDU Session, the SMF may provide information about the PDU Session to the NG-RAN. Here, the information about the PDU session may include information about the QoS Flow (information such as QFI, QoS Profile, etc.) and information such as CN Tunnel Info (or UL NG-U UP TNL Information). At this time, the SMF may also provide path information associated with the QoS Flow. The path information may be information about all paths associated with the QoS Flow, if the QoS Flow is associated with multiple paths. The SMF may also provide the path information associated with the CN Tunnel Info. If the MP PDU Session is associated with multiple paths, the path information may be information about all the associated paths.

Each path information may include one or more of the following:

a) Path ID;

b) Path type information (this is information about whether the path is a direct or indirect path); and/or c) Information about the UE-to-Network Relay if the path is an indirect path (this can be identifying information of the UE-to-Network Relay)

The above path information may be provided at all times for MP PDU sessions, or it may be provided only when the same NG-RAN serves multiple paths associated with an MP PDU session.

Regarding the SMF determining/obtaining the path information, reference may be made to the operation of the SMF determining or obtaining the information related to the path in the first example of the present disclosure above.

In the above, when a QoS Flow is associated with multiple paths, it can be interpreted that the data associated with the QoS Flow can be transmitted using those paths.

In the above, if a QoS Flow is associated with multiple paths, the QoS Profile may be provided for each path. The UPF allocates CN Tunnel Info, and the SMF may also provide information about the path when it requests CN Tunnel Info from the UPF for each path. Here, the information about the path may include Path ID, path type information (which is information about whether the path is a direct path or an indirect path), etc.

The above information about PDU Session can be interpreted as N2 SM information, PDU Session setup/modification related information, QoS Flow related information, CN Tunnel information, QoS Flow Level QoS Parameters information, etc.

The information for all QoS Flows provided by the SMF to the NG-RAN may be for one (i.e., the same) path. In this case, instead of providing said path information for each QoS Flow, the SMF may include said path information in the message containing the N2 SM information that it sends to the AMF, such that the path information is understood to be for a PDU Session or the path information is understood to correspond to all said QoS Flows.

The SMF may also send information to the NG-RAN indicating that the QoS Flow and/or PDU Session and/or N2 SM information is for an MP PDU Session. Part of the information indicating that said MP PDU Session is for an MP PDU Session may be provided by the AMF to the NG-RAN.

As described above, when the NG-RAN receives information about the PDU Session from the SMF, the NG-RAN may determine the path(s) associated with the PDU Session or the path(s) associated with the QoS Flow. Then, the NG-RAN may allocate/set a resource for the path(s). The resource allocation/setting may be an operation to allocate and/or set resources for the Uu and N3 (also referred to as NG-U) segments. The resource allocation/setting for the Uu segment may include the NG-RAN establishing a DRB with the UE, and the resource allocation/setting for the N3 segment may include the NG-RAN allocating AN Tunnel Info and providing it to the SMF.

Regarding the NG-RAN determining which path is a path based on information such as a path ID, reference can be made to the various examples of the first example of the present disclosure above.

If the Path ID is not assigned to the direct path but only to the indirect path, the UE may provide information about the PDU session and/or QoS Flow to the NG-RAN in a conventional manner, provided that the PDU session and/or QoS Flow is associated with the direct path. For example, the UE may provide information about the PDU session and/or QoS Flow without path information (i.e., information such as "a) Path ID" and "b) Path type" described above) in a conventional manner. In this case, the NG-RAN may infer that the relevant path is a direct path.

The Path ID may be used when the NG-RAN responds to information about a PDU Session sent by the SMF or when the NG-RAN provides information about PDU Session setup/modification to the SMF. It may also indicate which path the AN Tunnel Info corresponds to, or which path the PDU Session/QoS Flow that was successfully or unsuccessfully established corresponds to.

The SMF may also determine information about a PDU Session in an MP PDU Session through interaction with the PCF. The SMF MAY provide the PCF with information that the PDU Session is an MP PDU Session, path information associated with the MP PDU Session (this is the Path ID, path type information (this is information about whether the path is a direct path or an indirect path), etc.

4. The Fourth Example of the Present Disclosure of the Specification

The fourth example of the present disclosure of the specification describes an example in which the SMF provides information to the UE regarding the steering/routing of a Multi-Path PDU Session.

When the SMF provides information to the UE about the steering/routing of a Multi-Path PDU Session, the Path ID may be used to indicate which traffic may be steered/routed to which path.

The steering/routing related information of the Multi-Path PDU Session may indicate which path(s) are associated with the QoS Flow included in the QoS rules. The associated path may be represented by one or more of path ID, path type information. The steering/routing information for Multi-Path PDU Session may be provided to the UE as part of the QoS rules, or it may be provided to the UE as another type of policy (e.g., ProSe policy, etc.).

The ATSSS Rules for Multi-Access PDU Sessions as defined in clause 5.32.8 (ATSSS Rules) of TS 23.501 V16.9.0 may be utilized for steering/routing related information in MP PDU Sessions. In this case, ATSSS (Access Traffic Steering. Switching, Splitting) may be substituted with terms such as PTSSS (Path Traffic Steering. Switching, Splitting) or PTSS (Path Traffic Steering, Switching). The Access Selection Descriptor may be applied interchangeably with terms such as Path Selection Descriptor. In the Access Selection Descriptor, the access information (or access type) of 3GPP access and Non-3GPP access is used, but the Path ID may be used instead. And access can be understood by substituting path for access. Specifically, for the examples in Table 2 below, the above description may apply.

TABLE 2

| Information name | Description | Category | SMF permitted to modify in a PDU context | Scope |
|---|---|---|---|---|
| ATSSS Rule ID | Unique identifier to identify the ATSSS Rule | Conditional(NOTE 6) | No | PDU context |
| Rule Precedence | Determines the order in which ATSSS rules are evaluated in the UE | Mandatory(NOTE 1) | Yes | PDU context |
| Traffic Descriptor | This part defines the traffic descriptor component of the ATSSS rule | Mandatory (NOTE 2) | | |
| Application descriptors | Includes one or more application IDs that identify the application generating the traffic. (NOTE 3). | Optional | Yes | PDU context |
| IP descriptor (NOTE 4) | One or more 5-tuples that identify the destination of IP traffic. | Optional | Yes | PDU context |
| Non-IP descriptor(NOTE 4) | Includes one or more descriptors to identify the destination of non-IP traffic, such as Ethernet traffic. | Optional | Yes | PDU context |
| Access Selection Descriptor | This part defines the access selection descriptor component of the ATSSS rule | Mandatory | | |
| Steering Mode | Identifies the steering mode that can be applied to the matched traffic and associated parameters | Mandatory | Yes | PDU context |
| Steering Mode Indicator | Indicates either autonomous load-balance operation or UE-assistance operation if steering mode is set to “Load Balancing”. | Optional | Yes | PDU context |
| Threshold Values | A Maximum RTT and/or a Maximum Packet Loss Rate. | Optional | Yes | PDU context |
| Steering Functionality | For matched traffic, identifies whether the MPTCP feature or the ATSSS-LL feature can be applied. | Optional(NOTE 5) | Yes | PDU context |

In Table 2 above, NOTE1 through NOTE6 are as follows:
NOTE 1:
Each ATSSS rule may have a different precedence value from other ATSSS rules.
NOTE 2:
There may be more than one traffic descriptor component.
NOTE 3:
An application ID may include an Operating System Id (OSId) and an Operating System Application Id (OSAppId).
NOTE 4:
An ATSSS rule may not contain both IP and non-IP descriptors.
NOTE 5:
If the UE supports only one Steering Functionality, this component may be omitted.
NOTE 6:
If the UE indicates support for updating individual ATSSS rules, an ATSSS Rule ID must be present.

For example, the example in Table 2 is an example of the structure of an ATSSS rule according to the prior art. In a fourth example of the present disclosure, a PTSSS rule may be used based on a conventional ATSSS rule. For example, the SMF may provide the UE with PTSSS rules such as the example below. For example, the following PTSSS rules may be provided to the UE:

A) “Traffic Descriptor: UDP, DestAddr 1.2.3.4”, “Steering Mode: Active-Standby, Active=Path #x (Path #x refers to Path ID), Standby=Path #y (Path #y refers to Path ID)”;

This rule might mean “If available, steer UDP traffic with destination IP address 1.2.3.4 to the active access (Path #x). If active access is not available, use the standby access (Path #y)”.

B) “Traffic Descriptor: Application-1”. “Steering Mode: Load-Balancing, Path #x=20% (Path #x refers to Path ID), Path #y=80% (Path #y refers to Path ID)”:

This rule could mean “Send 20% of Application-1’s traffic to Path #x and 80% to Path #y”.

The SMF may also include MP PDU Session applicability or preference information in the URSP. For example, the Route selection components comprising the Route Selection Descriptor of the URSP may include “information about whether the UE, when creating a PDU Session for the application/traffic it is matching (i.e., matching the Traffic Descriptor of the URSP), may create it in the form of an MP PDU Session or whether it is preferred to create it in the form of an MP PDU Session”. This information may be included as an extension of an existing parameter or may be defined as a new parameter.

Regarding the SMF and UE determining which path is a path based on information such as a path ID, reference may be made to the first example of the present disclosure above, wherein the SMF and UE determine which path is a path based on any information.

The SMF may also determine information related to the steering/routing of MP PDU Sessions through interaction with the PCF. The SMF may provide the PCF with information that the PDU Session is an MP PDU Session, path information associated with the MP PDU Session (this is the Path ID, path type information (this is information about whether the path is a direct path or an indirect path), etc.

5. The Fifth Example of the Present Disclosure of the Specification

The fifth example of the present disclosure of the specification describes an example in which the SMF provides the N4 rules of a Multi-Path PDU Session to the UPF.

If the SMF provides UPF with N4 rules information (or N4 session related information) for a Multi-Path PDU Session, the SMF may use the Path ID to indicate which traffic may be steered/routed to which path.

The Multi-Access Rule for Multi-Access PDU Sessions as defined in clause 5.8.2.11.8 (Multi-Access Rule) of TS 23.501 V16.9.0 may be utilized for the N4 rules information (which may be referred to as Multi-Path Rule) for MP PDU Sessions. For a prior art Multi-Access Rule, the access information (or access type) of 3GPP access and Non-3GPP access is used, although a Path ID may be used instead of the access information. In addition, access may be replaced by path in a prior art Multi-Access Rule.

The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

FIG. 9 Illustrates an Example of a Multi-Access Rule.

As mentioned earlier, the Multi-Access Rule in FIG. 9 may be used for N4 rules information for MP PDU sessions.

With respect to the SMF and UPF determining which path is a path based on information such as a path ID, reference may be made to the first example of the present disclosure of the specification, wherein the SMF and UPF determine which path is a path based on arbitrary information.

The SMF may also determine the N4 rules of the MP PDU Session through interaction with the PCF. The SMF may provide the PCF with information that the PDU Session is an MP PDU Session, path information associated with the MP PDU Session (this is the Path ID, path type information (this is information about whether the path is a direct path or an indirect path), etc.

6. The Sixth Example of the Present Disclosure of the Specification

The sixth example of the present disclosure of the specification describes an example where the path of a Multi-Path PDU Session is changed.

If the path between the UE and the network changes, this may require changes to the path associated with the MP PDU Session.

In this case, the UE may initiate actions to change the path of the MP PDU Session.

The UE may provide information about the changing path to the SMF. The UE may further provide information about the changing path to the NG-RAN and/or AMF. The information about the changed path may be the information about the path described in the first example of the first part of the specification, including a path ID (which may be a path ID used by the path before the change, or a newly assigned path ID for the changed path).

The UE may additionally provide information about the path before the change in SMF.

When the UE performs an action to change the path of an MP PDU session, the UE may explicitly or implicitly inform the network that the action is to change the path of the MP PDU session.

To change the path of an MP PDU session, the UE may use existing NAS messages (e.g. PDU Session Modification Request, etc.), or it may use newly defined NAS messages.

The operation to change the path of a Multi-Path PDU Session may be initiated by an AMF or SMF that recognizes/detects a change in path.

7. The Seventh Example of the Present Disclosure of the Specification

The seventh example of the present disclosure of the specification describes an example of releasing and/or removing a path from a Multi-Path PDU Session.

If the path that connects the UE to the network is released and/or removed, this may also require changes to the path associated with the MP PDU Session (i.e., release and/or removal of the path).

In this case, the UE may initiate actions to release and/or remove the path from the MP PDU Session.

The UE may provide information about the path being released and/or removed in SMF. The UE may further provide information about the path being released and/or removed in NG-RAN and/or AMF. The information about the released/removed path may be a path ID, and the UE may further provide information about the path as described in the first example of the first part of this disclosure.

When performing an operation to release/remove a path for an MP PDU session, the UE may explicitly or implicitly inform the network that the operation is to de-path/remove an MP PDU session.

To release/remove a path from an MP PDU session, the UE may use existing NAS messages (e.g., PDU Session Modification Request, etc.), or it may use newly defined NAS messages.

As a path is released/removed from an MP PDU Session, this MP PDU Session may change to a general PDU Session (e.g., a PDU Session served over one 3GPP path). This may be accomplished by the UE requesting the network (e.g. SMF) to change the MP PDU Session to a normal PDU Session, or the network (e.g. SMF) may decide to make the change and notify the UE as the path is released/removed from the MP PDU Session.

If the UE requests a change, the following description may apply. If the release/removal of a path from an MP PDU Session results in the existence of only one path associated with the MP PDU Session, the UE may change/convert the MP PDU Session to a normal PDU Session using one of the following methods:

i) The UE may send a request message to the network to release and/or remove the path from the MP PDU Session. In doing so, the UE may include in said request message information requesting a change to a normal PDU Session (or information requesting a change to a Single-Path PDU Session);

ii) The UE may send a request message to the network to change and/or switch the MP PDU Session to a normal PDU Session. In doing so, the UE may include in said request message one or more of the following information; information about the path being released and/or removed (Path ID, etc.), information about the path being retained (Path ID, etc.).

The operations to release and/or remove a path from a Multi-Path PDU Session may be initiated by the AMF or SMF that recognizes/detects the release and/or removal of the path.

8. The Eighth Example of the Present Disclosure of the Specification

The eighth example of the present disclosure of the specification describes an example in which a UE-associated logical NG-connection between the NG-RAN and the AMF is created and/or maintained per path formed by the UE with the network.

According to the prior art, a UE-associated logical NG-connection between the NG-RAN and the AMF may be created/maintained per UE.

In the eighth example of the present disclosure, instead of UE-associated logical NG-connection between the NG-RAN and the AMF being created and/or maintained on a per-UE basis, UE-associated logical NG-connection between the NG-RAN and the AMF may be created and/or maintained on a per-path basis that the UE has formed with the network. For each UE-associated logical NG-connection, an AMF UE NGAP ID and a RAN UE NGAP ID may be assigned/used.

The behavior that the UE-associated logical NG-connection between the NG-RAN and the AMF is created and/or maintained per path formed by the UE with the network may only apply when the same NG-RAN serves multiple paths, as shown in FIG. 8*a* and FIG. 8*b*.

The NG-RAN and AMF may store which UE-associated logical NG-connection is for which path.

When the AMF and the NG-RAN exchange N2 messages, if they are for a specific path, they may be exchanged over the corresponding UE-associated logical NG-connection.

9. The Ninth Example of the Present Disclosure of the Specification

The ninth example of the present disclosure of the specification describes an example in which an SMF provides a target path for transferring N1 SM container and/or N2 SM information to an AMF.

The SMF may transfer the N1 SM container and/or N2 SM information to the AMF (for example, the SMF may use Namf_Communication_N1N2MessageTransfer to transfer the N1 SM container and/or N2 SM information). The SMF may provide the target path to which the N1 SM container and/or N2 SM information should be sent to the AMF using one or more of the following information: path ID, path type.

In this case, it may be possible to provide different target paths for the N1 SM container and N2 SM information.

The AMF may provide the above target path information to the NG-RAN. The NG-RAN may then send the N1 SM container to the UE over the target path. And the NG-RAN may recognize that the N2 SM information is for the target path.

Alternatively, a UE-associated logical NG-connection between the AMF and the NG-RAN may exist per path. In this case, when the AMF transmits the N1 SM container and/or N2 SM information received from the SMF to the NG-RAN, it may also transmit the N1 SM container and/or N2 SM information to the NG-RAN via the UE-associated logical NG-connection corresponding to the target path, so that the NG-RAN may infer/recognize the target path.

10. The Tenth Example of the Present Disclosure of the Specification

The tenth example of the present disclosure of the specification describes an example of using Multi-path and Multi-access (i.e., 3GPP access and non-3GPP access) in parallel. For example, a single PDU session may be used as an MP PDU session and a Muti-Access (MA) PDU session.

A UE may be provided with services over multiple paths and may also be provided with services over non-3GPP access. In such cases, the PDU Session may be both an MP PDU Session as described at the present disclosure of the specification and a Multi-access PDU Session (MA PDU Session). For a basic description of MA PDU Sessions, the reader is referred to TS 23.501 V16.9.0, clause 5.32 (Support for ATSSS), TS 23.502 and TS 23.503.

The multi-path related policy information provisioned to the UE described in the various examples of the first part of this disclosure above may also include multi-access related policy information. Alternatively, a URSP that includes conventional multi-access related policy information may be extended to include multi-path related policy information.

For example, policy information that is mapped/matched to or associated with one or more of the following information: DNN, S-NSSAI, Application, ProSe service, Relay Service Code, etc. may be configured to enable multi-access while also enabling multi-path. Such policy information may be referred to as multi-path-access policy information or multi-access-path policy information.

If URSP is used, for the example Route Selection Descriptor in Table 3 below based on Table 6.6.2.1-3 of TS 23.503, multi-path related information (e.g. Multi-path preference, Multi-path indication, etc.) may be added as part of the Route selection components information. This would eventually indicate that multi-path may be used for applications, traffic, etc. that are matched/mapped to the Traffic descriptor in Table 6.6.2.1-2: UE Route Selection Policy Rule in TS 23.503 V16.9.0, as well as indicating that multi-access may be used by setting the conventional Access Type preference to Multi-Access. Alternatively, as part of the Route selection components information included in the example in Table 3, a single indication (e.g., Multi-path-access preference, Multi-access-path preference. Multi-path-access indication, Multi-access-path indication, etc.) may be defined and used to indicate that both multi-path and multi-access may be used.

TABLE 3

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |

TABLE 3-continued

| Information name | Description | Category | PCF permitted to modify in URSP | Scope |
|---|---|---|---|---|
| Route selection components | This part defines the route selection components | Mandatory (NOTE 2) | | |
| SSC Mode Selection | One single value of SSC mode.(NOTE 5) | Optional | Yes | UE context |
| Network Slice Selection | Either a single value or a list of values of S-NSSAI(s). | Optional(NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| ProSe Layer-3 UE-to-Network Relay Offload indication | Indicates if the traffic of the matching application is to be sent via a ProSe Layer-3 UE-to-Network Relay outside of a PDU session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| PDU Session Pair ID | An indication shared by redundant PDU Sessions as described in clause 5.33.2.1 of TS 23.501 [2]. | Optional | Yes | UE context |
| RSN | The RSN as described in clause 5.33.2.1 of TS 23.501 [2]. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

In Table 3 above, NOTE 1 through NOTE 8 are shown below:

NOTE 1:

Every Route Selection Descriptor in this list has a different precedence value.

NOTE 2:

At least one route selection component exists.

NOTE 3:

If the Subscription Information contains only one S-NSSAI within the UDR, the PCF does not need to provision the S-NSSAI to the UE in the Network Slice Selection information. A “match all” URSP rule has a maximum of one S-NSSAI.

NOTE 4:

If this indication is present in the Route Selection Descriptor, the Route Selection Descriptor does not contain any other components.

NOTE 5:

SSC Mode 3 may only be used when the PDU Session Type is IP.

NOTE 6:

A Route Selection Descriptor may not be considered valid unless all of the Validation Criteria provided are met.

NOTE 7:

The inclusion of Validation Criteria is not considered in roaming scenarios.

NOTE 8:

If the PDU session type is “Ethernet” or “Unstructured”, this component must be present.

When generating or establishing a Multi-path-access PDU Session (MPA PDU Session—which may also be referred to as a Multi-access-path PDU Session (MAP PDU Session)), the UE may provide information about it to the SMF. Such information may include information indicating that the PDU Session to be created is an MPA PDU Session, or information indicating that both multi-path and multi-access are to be used. In addition, the UE may provide the SMF with various information that the UE provides to the SMF when generating an MP PDU Session as described herein (e.g., see the first example of the first clause of the specification and the second example of the second clause of the specification) and information that the UE provides to the SMF when creating a conventional MA PDU Session.

The UE may create a normal PDU session and then convert/switch the PDU session to an MPA PDU session as paths and/or accesses are added.

As the UE removes/disconnects paths and/or accesses, the MPA PDU Session may be converted to one of MP PDU Session, MA PDU Session, or normal PDU Session. For example, if a UE is using an MPA PDU Session over two paths (e.g., direct path and indirect path) and non-3GPP access, and the non-3GPP access is removed/disconnected, the MPA PDU Session may be converted to an MP PDU Session for use. As another example, if a UE is using an MPA PDU Session with two paths (e.g. direct path and indirect path) and non-3GPP access and one of the direct path or indirect path is removed/disconnected, the MPA PDU Session may be converted to an MA PDU Session. As another example, if a UE is using an MPA PDU Session with two paths (e.g., direct path and indirect path) and non-3GPP access, and then removes/disconnects one direct path or indirect path and non-3GPP access, the MPA PDU Session may be converted to a regular PDU Session.

The switchability between the above PDU session types/types may also be set in multi-path-access policy information, multi-access-path policy information, and policies such as URSP (e.g., policies that are provisioned to the UE).

For switching between said PDU Session types/types, existing PDU Session Modification related messages/procedures may be extended and used, or new SM messages/procedures may be defined and used. The UE may provide the SMF with the above switching related information and/or the type of PDU Session being switched.

In the above example, the UE determines and performs the various switches between PDU session classes/types, but this is only an example and the SMF may also determine and perform the various switches between PDU session classes/types instead of the UE. To make these decisions, the SMF may use local configuration information, subscriber information, information provided by the PCF (for example, the SMF may notify the PCF that a UE's path has been added or removed, or that a UE's access has been added or removed), etc.

The messages/procedures related to PDU Session Modification may be extended and used, or new SM messages/procedures may be defined, for switching between PDU Session types/types performed by the SMF. The SMF may provide the UE with information related to said switching and/or the type of PDU Session being switched.

For the information provided by the SMF for MPA PDU Sessions (e.g., PDU Session related information/QoS profiles provided by the SMF to the NG-RAN, steering/routing related information provided by the SMF to the UE, N4 rules provided by the SMF to the UPF, etc.), the contents described in the third to fifth examples of the present disclosure may be applied in an integrated form with the information related to PDU Sessions and conventional MA PDU Sessions.

11. The Eleventh Example of the Present Disclosure of the Specification

Eleventh examples of the present disclosure describe embodiments that combine at least one of the first to tenth examples of the present disclosure.

11-1. A First Example of the Eleventh Example of the Present Disclosure of the Specification The first example of the eleventh example of the present disclosure describes an example in which the path ID is assigned/determined by the UE when Path #1 is a direct path and Path #2 is an indirect path.

The first example of the eleventh embodiment of the present disclosure describes an example that combines the first to fifth examples of the present disclosure. For example, the first example of the eleventh example of the present disclosure describes an embodiment applying the contents of the first example of the eleventh example of the present disclosure, wherein the path ID is assigned/determined by the UE for a case where Path #1 is a direct path and Path #2 is an indirect path.

Specifically, the present disclosure describes an embodiment that applies "l) assigning a Path ID for both direct and indirect paths whenever a UE connects to the network on a new path (or whenever a new path is formed, or whenever a new path is desired to be formed)" of the first example of the first example of the present disclosure.

The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

Figure 10A:
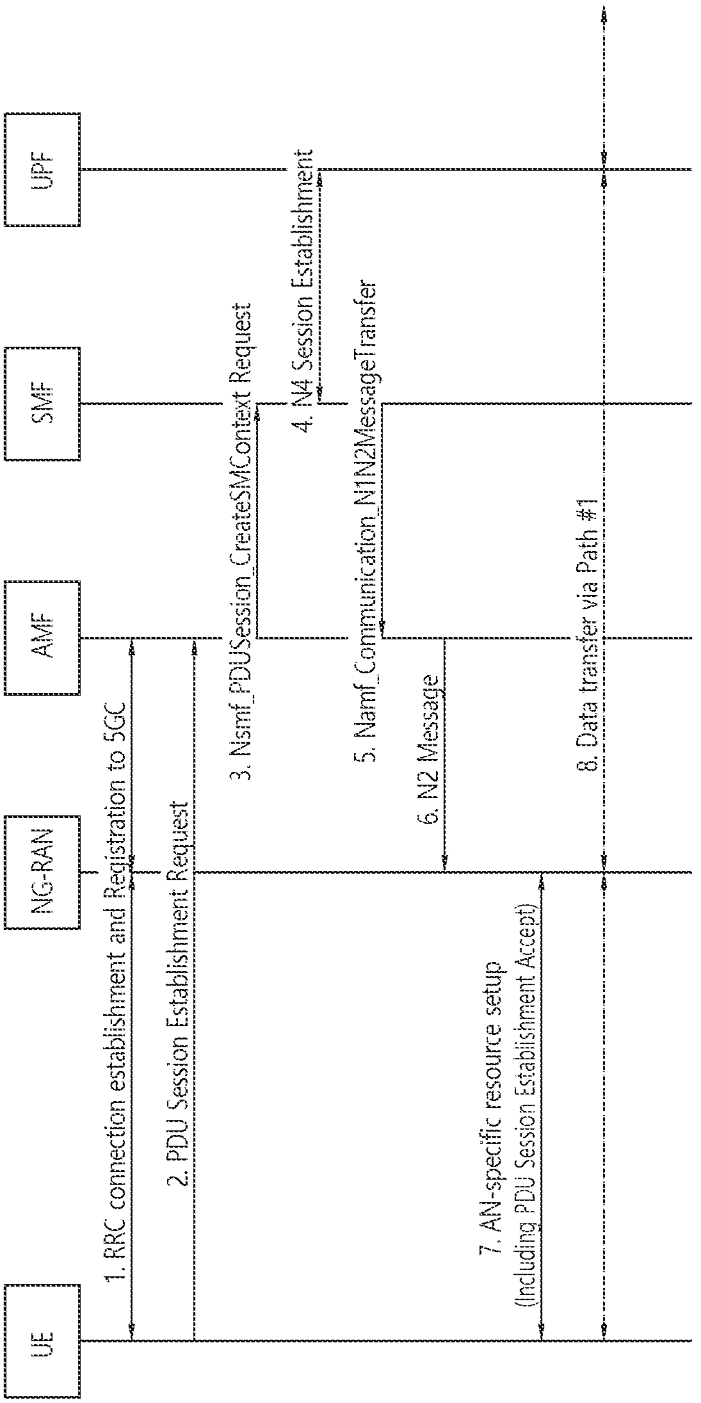
FIGS. 10*a* and 10*b* illustrate an example of operation according to a first example of the eleventh example of the present disclosure.
Figure 10B:
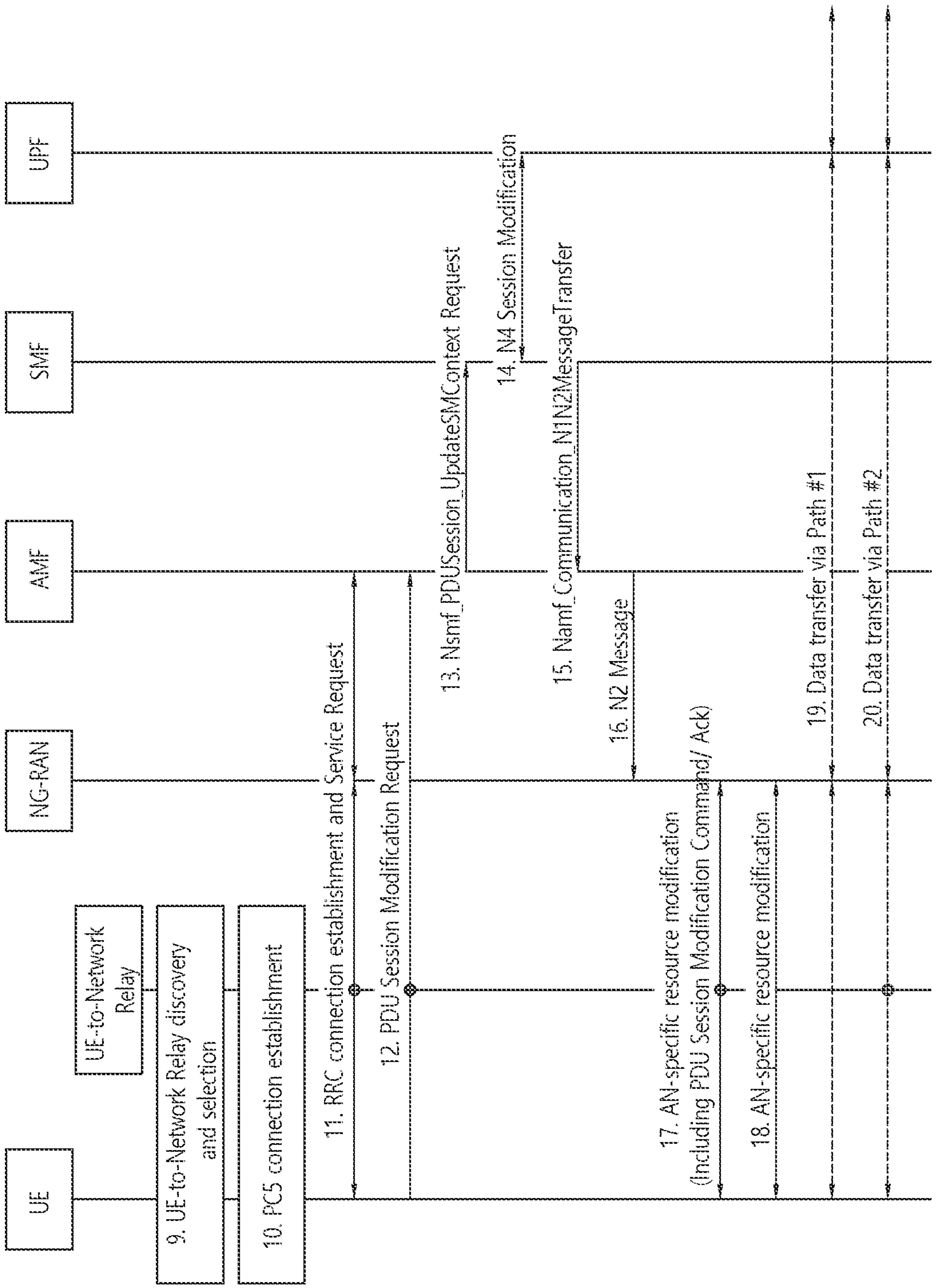

FIGS. 10*a* and 10*b* Illustrate an Example of Operation According to a First Example of the Eleventh Example of the Present Disclosure.

Step 1. The UE may assign Path ID=Path #1 for the direct path. The UE may perform the RRC connection establishment procedure and registration procedure with the network. At this time, the UE may provide the Path ID assigned to the direct path to the NG-RAN.

With respect to Step 1, the reader is referred to the first example of the first aspect of the present disclosure described above for further details.

Step 2-3. The UE may request the SMF to generate a PDU session through the AMF. For example, the UE may send a PDU Session Establishment Request message to the AMF, and the AMF may send a request message (e.g., Nsmf_PDUSession_CreateSMContext Request message) to the SMF containing the PDU Session Establishment Request message. The UE may include the information Path ID=Path #1 in the PDU Session Establishment Request message for said request. In addition, the UE may include in the PDU Session Establishment Request message information indicating that it is a Multi-Path PDU Session, information indicating that it is a direct path, etc.

With respect to Step 1, the reader is referred to the first example of the first example of the present disclosure of the specification and the second example of the second example of the present disclosure of the specification for further details.

Step 4. The SMF may generate (or establish) an N4 Session with the UPF for said PDU Session. This allows the SMF to set packet detection, enforcement and reporting rules for said PDU Session with UPF. The SMF may use Path IDs to indicate which traffic may be steered/routed to which paths.

With respect to Step 4, see Example 5 at the present disclosure of the specification for more information.

Step 5. The SMF may send a Namf_Communication_N1N2MessageTransfer to the AMF containing N2 SM information to the NG-RAN and NAS messages to the UE (e.g. PDU Session Establishment Accept message).

The above N2 SM information may include information about QoS Flow for Path #I (QFI, QoS Profile, etc.) and CN Tunnel Info (or UL NG-U UP TNL Information).

With respect to Step 5, it is referred to contents of the third example of the present disclosure of the specification for further details.

Step 6. The AMF may send the N2 SM information and NAS messages received from the SMF to the NG-RAN.

Step 7. The NG-RAN may allocate/set resources for Path #1 based on the PDU Session related information received from the SMF. The resource allocation/setting may be for the Uu and N3 (also referred to as NG-U) segments. Regarding step 7, for details, reference may be made to the third example of the present disclosure.

In addition, the NG-RAN may send a PDU Session Establishment Accept message to the UE.

Step 8. The UE may send and receive data over Path #1.

Step 9. The UE may navigate to the UE-to-Network Relay and select the UE-to-Network Relay to use the indirect path.

Step 10. The UE may form a PC5 connection with the UE-to-Network Relay.

Step 11. The UE may assign Path ID=Path #2 for the indirect path. The UE may establish RRC connection with the network through UE-to-Network Relay and perform service request. At this time, the UE may provide the Path ID assigned to the indirect path to the NG-RAN.

With respect to step 11, reference is made to the first example of the first example of the present disclosure of the specification for further details.

Step 12-13. For the PDU Session created via step 2 above, the UE may request the SMF to change the PDU Session or add a path. For example, the UE may send a PDU Session Modification Request message to the AMF to request a PDU Session change or path addition. The UE's request may be transmitted to the SMF via the UE-to-Network Relay and the AMF. The UE may include Path ID=Path #2 in the PDU Session Modification Request message for said request. In addition, information indicating that it is a Multi-Path PDU Session and information indicating that it is an indirect path may be included in the PDU Session Modification Request message.

With respect to steps 12 and 13, reference is made to the first example of the first example of the present disclosure of the specification and the second example of the second part of the specification for further details.

Step 14. The SMF may modify the N4 Session for the above PDU Session with the UPF. Using the Path ID, the SMF may indicate which traffic may be steered/routed to which path, and the SMF may provide the UPF with N4 rules for one or more of the paths between Path #1 and Path #2.

With respect to Step 14, it is referred to the fifth example of the present disclosure of the specification for further details.

Step 15. The SMF may send a Namf_Communication_N1N2MessageTransfer, to the AMF, including N2 SM information to be sent to the NG-RAN and NAS messages (e.g., PDU Session Modification Command messages) to be sent to the UE.

The N2 SM information may include information about the QoS Flow for Path #2 (information such as QFI, QoS Profile, etc.) and information such as CN Tunnel Info (or UL NG-U UP TNL Information). Further, the N2 SM information may include information about the updated QoS Flow for Path #1 (information such as QFI, QoS Profile, etc.) and information such as CN Tunnel Info (or UL NG-U UP TNL Information).

With respect to Step 15, it is referred to the third example of the present disclosure for further details.

The PDU Session Modification Command message may include information related to the steering/routing of the PDU Session provided to the UE, and may use the Path ID to indicate which traffic may be steered/routed to which path.

With respect to Step 15, see the fourth example of the present disclosure of the specification for further details.

Step 16. The AMF may send the N2 SM information and NAS messages received from the SMF to the NG-RAN.

Step 17. Based on the PDU Session related information received from the SMF, the NG-RAN may allocate/establish resources for Path #2. The resource allocation/setting may be for the Uu and N3 (also known as NG-U) segments. For the Uu segment, the resource may be allocated/set with the UE via UE-to-Network Relay. For further details, reference may be made to the third example in the present disclosure of the specification.

The NG-RAN may also send a PDU Session Modification Command message to the UE via UE-to-Network Relay. The NG-RAN may receive a PDU Session Modification Ack message from the UE.

Step 18. If the N2 SM information received from the SMF in step 16 above includes information about Path #1, the NG-RAN may set/update the resource for Path #1. Step 18 may be performed before performing the operation of step 17 above. For example, in step 17, the NG-RAN may include the resource allocation/setting information for Path #2 in the RRC message to be sent to the UE, and further include the resource setting/updating information for Path #1 in the RRC message.

For more information, see the third example of the present disclosure of the specification.

Step 19. The UE may send and receive data over Path #1.

Step 20. The UE may send and receive data via Path #2, i.e., via UE-to-Network Relay.

Unlike the example described earlier, the UE may provide the NG-RAN with the Path ID assigned to the direct path and the Path ID assigned to the indirect path in step 2 and step 12, respectively, instead of step 1 and step 11.

11-2. A Second Example of the Eleventh Example of the Present Disclosure of the Specification The second example of the eleventh example of the present disclosure describes an example in which the path ID is assigned/determined by the UE when Path #1 is an indirect path and Path #2 is a direct path.

The second example of the eleventh embodiment of the present disclosure describes an example that combines the first to fifth examples of the present disclosure. For example, the second example of the eleventh example of the present disclosure describes an embodiment applying the contents of the first example of the eleventh example of the present disclosure, wherein the path ID is assigned/determined by the UE for a case where Path #1 is an indirect path and Path #2 is a direct path.

Specifically, the present disclosure describes an embodiment that applies "1) assigning a Path ID for both direct and indirect paths whenever a UE connects to the network on a new path (or whenever a new path is formed, or whenever a new path is desired to be formed)" of the first example of the first example of the present disclosure.

The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

Figure 11A:
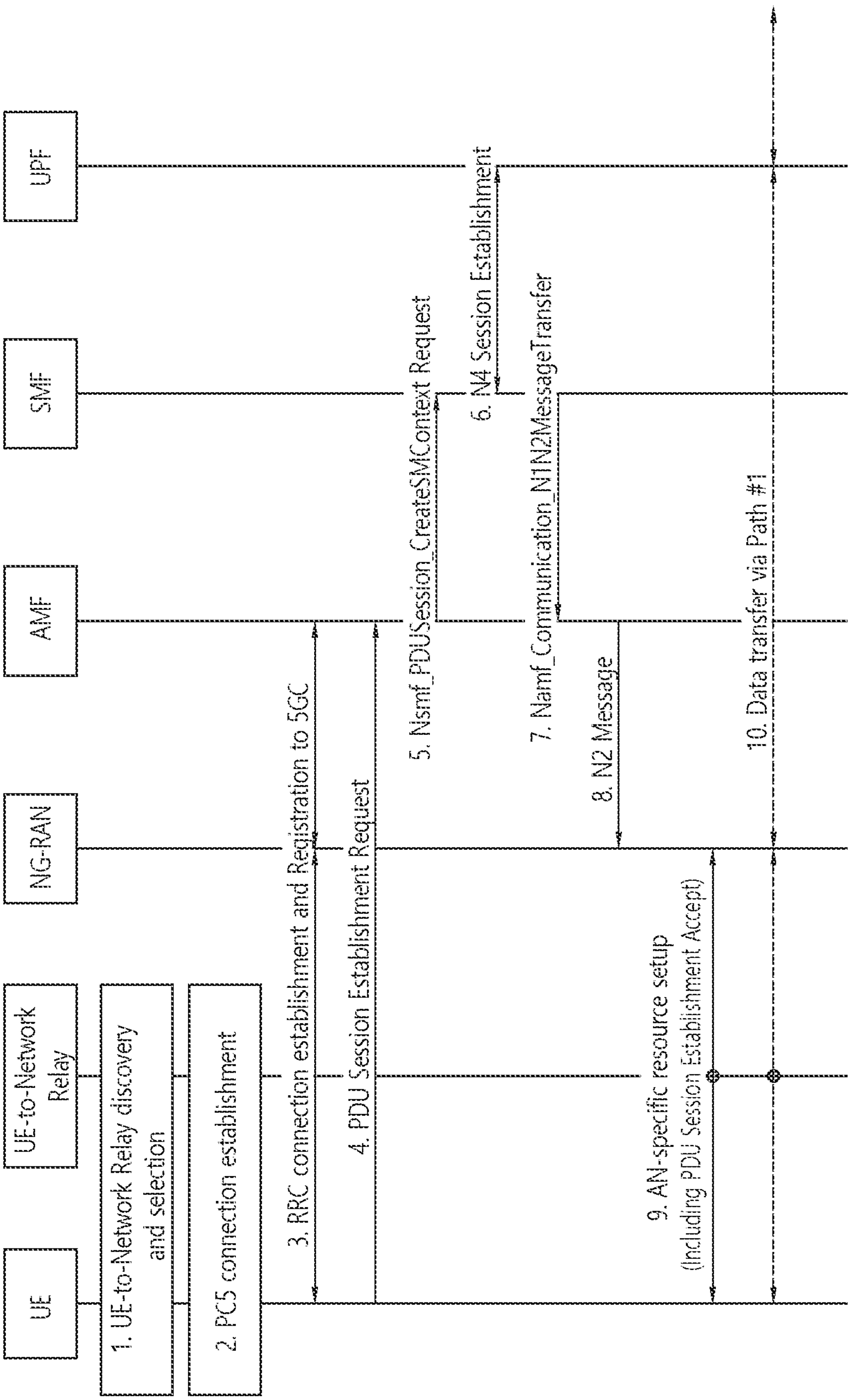
FIGS. 11*a* and 11*b* illustrate an example of operation according to a second example of the eleventh example of the present disclosure.
Figure 11B:
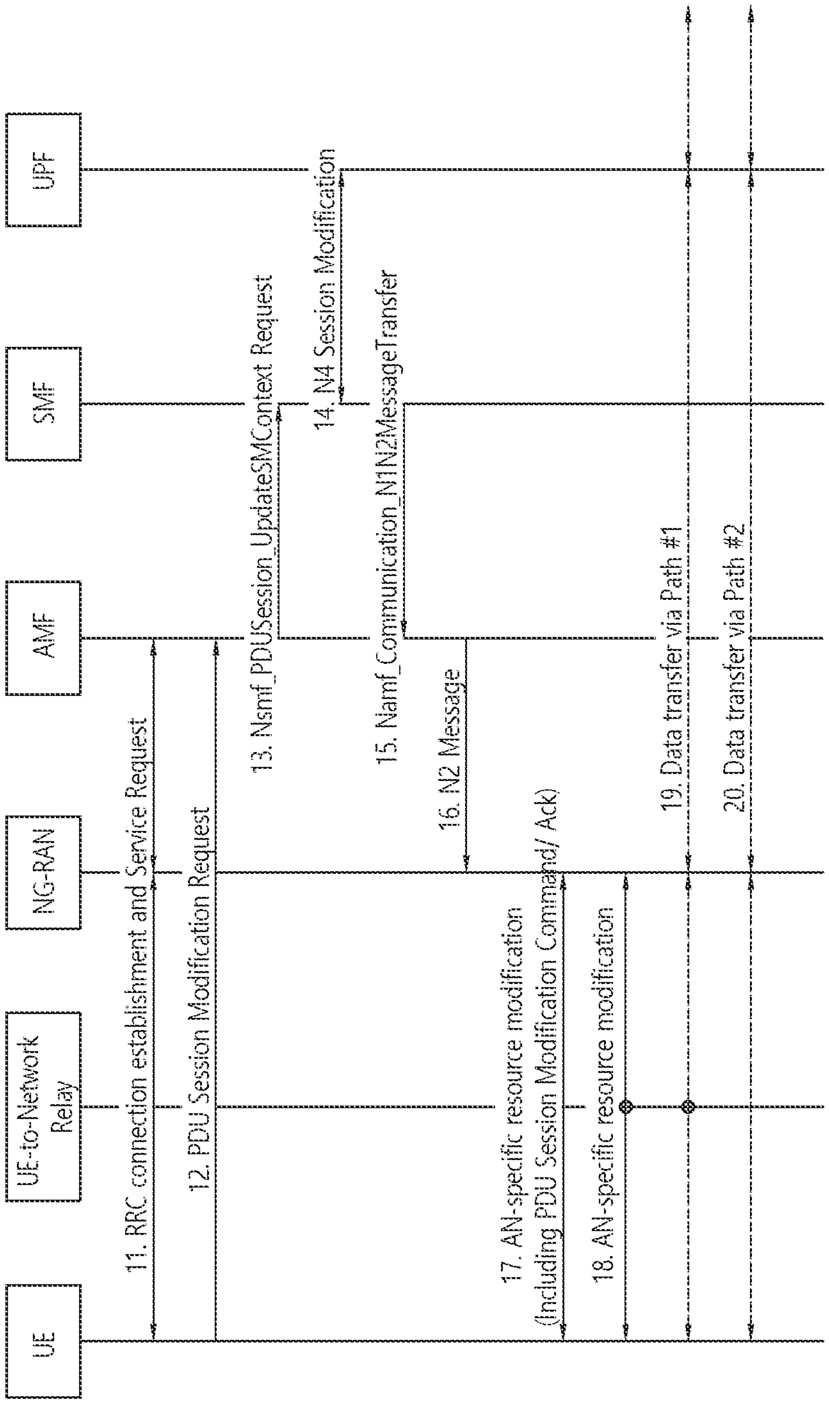

FIGS. 11*a* and 11*b* Illustrate an Example of Operation According to a Second Example of the Eleventh Example of the Present Disclosure.

Step 1. The UE may navigate to the UE-to-Network Relay and select the UE-to-Network Relay to use the indirect path.

Step 2. The UE may form a PC5 connection with the UE-to-Network Relay.

Step 3. The UE may assign Path ID=Path #1 for the indirect path. The UE may perform RRC connection establishment and registration with the network via UE-to-Network Relay. At this time, the UE may provide the Path ID assigned to the indirect path to the NG-RAN.

For more information, refer to the first example of the first example of the present disclosure of the specification.

Step 4-5. The UE may request the SMF to create a PDU session via UE-to-Network Relay and the AMF. For example, the UE may send a PDU Session Establishment Request message to the AMF via UE-to-Network Relay, and the AMF may send a request message (e.g., Nsmf_PDUSession_CreateSMContext Request message), to the SMF, including the PDU Session Establishment Request message. The UE may include the information Path ID=Path #1 in the PDU Session Establishment Request message for said request. In addition, the UE may include in the PDU Session Establishment Request message information indicating that it is a Multi-Path PDU Session, information indicating that it is an indirect path, etc.

For more information, see the first example of the first example of the present disclosure of the specification and the second example of the present disclosure of the specification.

Step 6. The SMF may create (or establish) an N4 Session with the UPF for said PDU Session. This allows the SMF to set packet detection, enforcement and reporting rules for said PDU Session with UPF. The SMF may use Path IDs to indicate which traffic may be steered/routed to which paths.

For more information, see the fifth example of the present disclosure of the specification.

Step 7. The SMF may send a Namf_Communication_N1N2MessageTransfer to the AMF containing N2 SM information to the NG-RAN and NAS messages to the UE (e.g. PDU Session Establishment Accept message).

The above N2 SM information may include information about QoS Flow for Path #1 (QFI, QoS Profile, etc.) and CN Tunnel Info (or UL NG-U UP TNL Information).

For more information, see the third example of the present disclosure of the specification.

Step 8. The AMF may send the N2 SM information and NAS messages received from the SMF to the NG-RAN.

Step 9. The NG-RAN may allocate/set resources for Path #1 based on the PDU Session related information received from the SMF. The resource allocation/setting may be for the Uu and N3 (also known as NG-U) segments. For the Uu segment, the NG-RAN may allocate/establish resources with the UE via UE-to-Network Relay. For further details, reference may be made to Example 3 of the present disclosure of the specification.

In addition, the NG-RAN may send PDU Session Establishment Accept messages to the UE via UE-to-Network Relay.

Step 10. The UE may send and receive data over Path #1.

Step 11, the UE may assign Path ID=Path #2 for the direct path. The UE may perform RRC connection establishment procedure and service request procedure with the network. At this time, it may provide the NG-RAN with the Path ID assigned to the above direct path to the NG-RAN.

For further details, reference is made to the first example of the first example of the present disclosure of the specification.

Step 12-13. For the PDU Session created via step 4 above, the UE may request the SMF via AMF to modify the PDU Session or add a path. The UE may include Path ID=Path #2 in the PDU Session Modification Request message for the above request. The UE may also include information indicating that it is a Multi-Path PDU Session, information indicating that it is an indirect path, etc. in the PDU Session Modification Request message.

For more information, see the first example of the first example of the present disclosure of the specification and the second example of the second example of the present disclosure of the specification.

Step 14 to Step 16. In the example of FIGS. 11*a* and 11*b*, Step 14 to Step 16 may be performed in the same manner as Step 14 to Step 16 in the example of FIGS. 10*a* and 10*b*. Reference will be made to Steps 14 through 16 of the examples of FIGS. 10*a* and 10*b* for detailed operations.

Step 17. Based on the PDU Session related information received from the SMF, the NG-RAN may allocate/set resources for Path #2. The resource allocation/setting may be for the Uu and N3 (also referred to as NG-U) segments. For more details, reference may be made to the third example of the beginning of the specification.

The NG-RAN may also send a PDU Session Modification Command message to the UE. The NG-RAN may receive a PDU Session Modification Ack message from the UE.

Step 18. If the N2 SM information received from the SMF in step 16 above includes information about Path #1, the NG-RAN may set/update the resource for Path #1. Step 18 may be performed before performing the operation of step 17 above. For example, in step 17, the NG-RAN may include the resource allocation/setting information for Path #2 in the RRC message to be sent to the UE, and further include the resource setting/updating information for Path #1 in the RRC message.

For more information, see the third example of the present disclosure of the specification.

Step 19. The UE may transmit and receive data via Path #1, i.e., via UE-to-Network Relay.

Step 20, the UE may send and receive data over Path #2.

Unlike the previously described example, the UE may provide the NG-RAN with the Path ID assigned to the indirect path and the Path ID assigned to the direct path in step 4 and step 12, respectively, instead of step 3 and step 11.

11-3. A Third Example of the Eleventh Example of the Present Disclosure of the Specification The third example of the eleventh example of the present disclosure describes an example in which the path ID is assigned/determined by the UE when Path #1 is a direct path and Path #2 is an indirect path.

The third example of the eleventh example of the present disclosure describes an example that combines the first to fifth examples of the present disclosure of the specification. For example, the third example of the eleventh example of the present disclosure of the specification describes an embodiment applying the contents of the first example of the eleventh example of the present disclosure, wherein the path ID is assigned/determined by the UE for a case where Path #1 is a direct path and Path #2 is an indirect path.

Specifically, the present disclosure describes an embodiment that applies "2) assigning a Path ID whenever the UE connects to the network on a new path (or whenever a new path is formed, or whenever a new path is desired to be formed) for an indirect path only." of the first example of the first example of the present disclosure.

The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

Figure 12A:
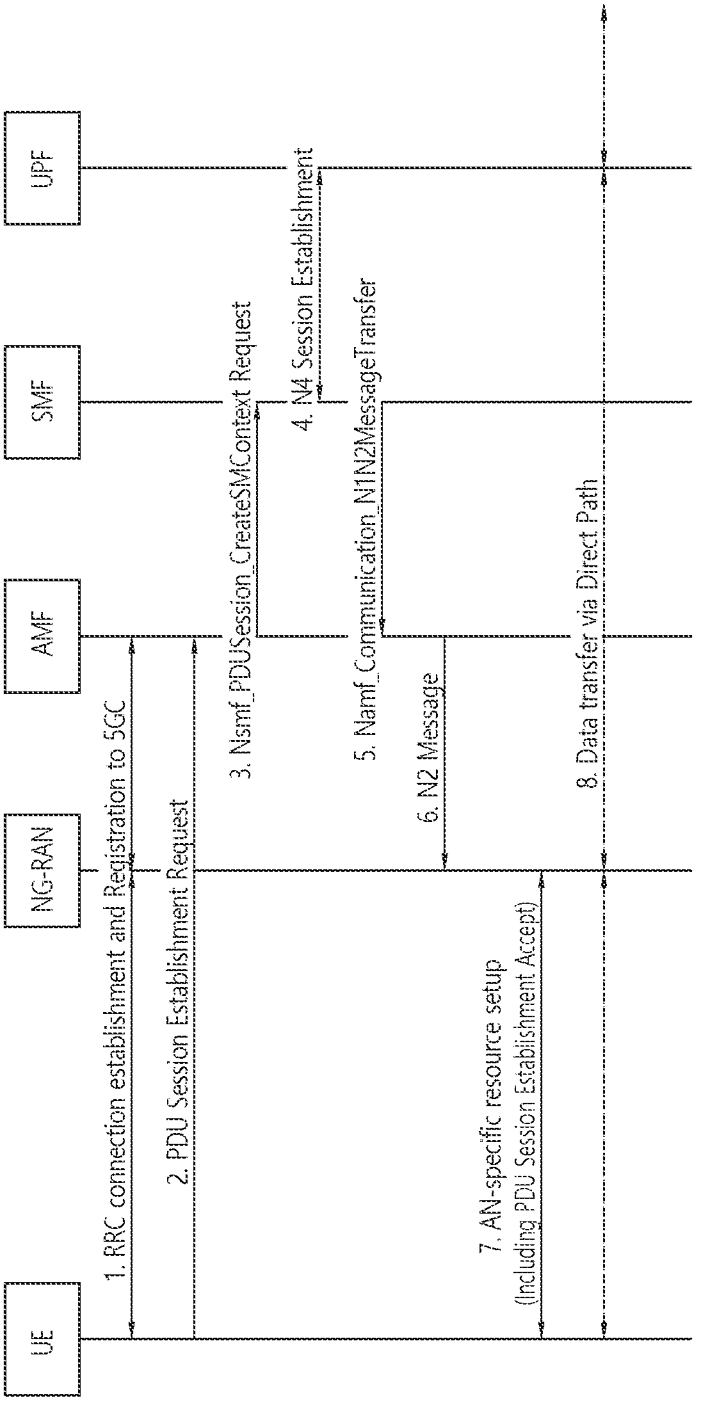
FIGS. 12*a* and 12*b* illustrate an example of operation according to the third example of the eleventh example of the present disclosure.
Figure 12B:
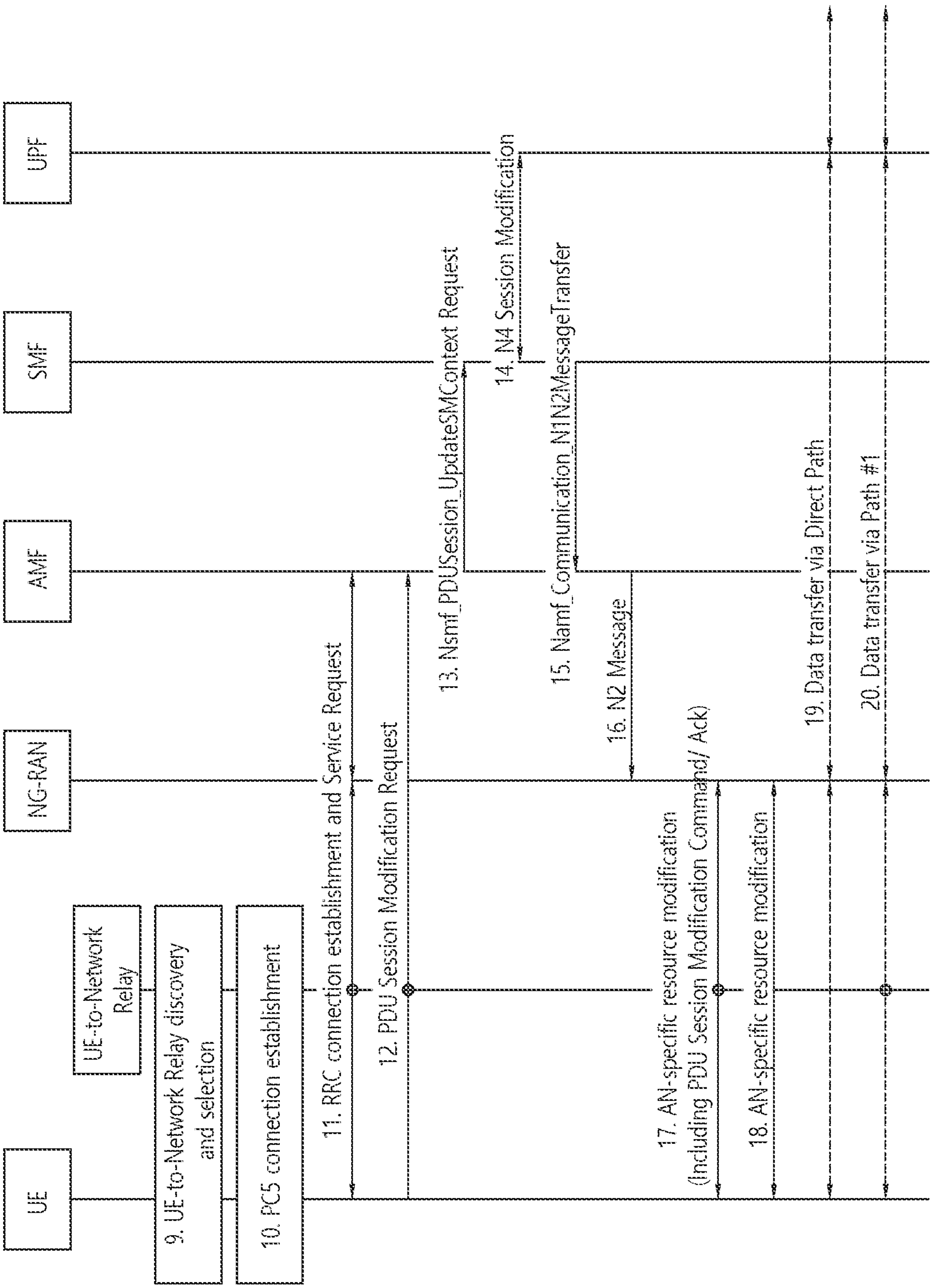

FIGS. 12*a* and 12*b* illustrate an example of operation according to the third example of the eleventh example of the present disclosure.

Step 1. The UE does not assign a Path ID for the direct path. The UE may perform the RRC association establishment procedure and registration procedure with the network.

Step 2-3. The UE may request the SMF to create a PDU Session via AMF. The UE may include in the PDU Session Establishment Request message for the request information indicating that it is a Multi-Path PDU Session.

For more information, see the second example of the present disclosure of the specification.

Step 4. The SMF may create (or establish) an N4 Session with the UPF for said PDU Session. This allows the SMF to set packet detection, enforcement and reporting rules for said PDU Session for the UPF.

Step 5. The SMF may send a Namf_Communication_N1N2MessageTransfer to the AMF containing N2 SM information to the NG-RAN and NAS messages to the UE (e.g. PDU Session Establishment Accept message).

The above N2 SM information may include information on QoS Flow for the direct path (QFI, QoS Profile, etc.) and CN Tunnel Info (or UL NG-U UP TNL Information).

Step 6. The AMF may transmit the N2 SM information and NAS messages received from the SMF to the NG-RAN.

Step 7. The NG-RAN may allocate/set resources for the direct path based on the PDU Session related information received from the SMF. The resource allocation/setting may be for the Uu and N3 (also known as NG-U) segments.

NG-RAN also transmits a PDU Session Establishment Accept message to the UE.

Step 8. The UE may transmit and receive data over the direct path.

Step 9. The UE may discover the UE-to-Network Relay and select the UE-to-Network Relay to utilize the indirect path.

Step 10. The UE may form a PC5 connection with the UE-to-Network Relay.

Step 11. The UE may assign Path ID=Path #1 for the indirect path. The UE may establish RRC connection with the network through UE-to-Network Relay and perform service request. At this time, the UE may provide the Path ID assigned to the indirect path to the NG-RAN.

For more information, refer to the first example of the first example of the present disclosure of the specification.

Step 12-13. The UE may request the SMF to change the PDU session or add a path for the PDU session created through step 2 above. The UE's request may be sent to the SMF via UE-to-Network Relay and AMF. The UE may include Path ID=Path #1 in the PDU Session Modification Request message for the request. In addition, information indicating that it is a Multi-Path PDU Session and information indicating that it is an indirect path may be included in the PDU Session Modification Request message.

For more information, see the first example of the first example of the present disclosure the specification and the second example of the second example of the present disclosure the specification.

Step 14. The SMF may modify the N4 Session for the above PDU Session with the UPF. The SMF may use the Path ID to indicate which traffic may be steered/routed to which path (including by not providing a Path ID and/or by indicating that it is a direct path so that UPF is aware of the N4 rules for the direct path). The SMF may provide UPF with N4 rules for one or more paths: a direct path for which it does not assign a Path ID and an indirect path for which it assigns a Path ID as Path #1.

For more information, see the fifth example of the present disclosure of the specification.

Step 15. The SMF may send a Namf_Communication_N1N2MessageTransfer to the AMF including N2 SM information to be sent to the NG-RAN and NAS messages (e.g., PDU Session Modification Command messages) to be sent to the UE.

The N2 SM information may include information about the QoS Flow for Path #1 (information such as QFI, QoS Profile, etc.) and information such as CN Tunnel Info (or UL NG-U UP TNL Information). Further, the N2 SM information may include information about the updated QoS Flow (information such as QFI, QoS Profile, etc.) and information such as CN Tunnel Info (or UL NG-U UP TNL Information) for the direct path that has not been assigned a Path ID. This may be done by not providing a Path ID for the direct path and/or by indicating that it is a direct path so that the NG-RAN may recognize that the information is for a direct path.

For more information, see the third example of the present disclosure of the specification.

The PDU Session Modification Command message may include information related to the steering/routing of the PDU Session provided to the UE, and may use the Path ID to indicate which traffic may be steered/routed to which path (including by not providing a Path ID and/or by indicating that it is a direct path so that the UE is aware that the information is for a direct path).

For more information, see the fourth example of the present disclosure of the specification.

Step 16. The AMF may send the N2 SM information and NAS messages received from the SMF to the NG-RAN.

Step 17. Based on the PDU Session related information received from the SMF, the NG-RAN may allocate/set resources for Path #1. The resource allocation/setting may be for the Uu and N3 (also known as NG-U) segments. For the Uu segment, the resource may be allocated/established with the UE via UE-to-Network Relay. For further details, reference may be made to the third example in the present disclosure of the specification.

The NG-RAN may also send a PDU Session Modification Command message to the UE via UE-to-Network Relay. The NG-RAN may receive a PDU Session Modification Ack message from the UE.

Step 18. If the N2 SM information received from the SMF in step 16 above includes information about the direct path, the NG-RAN may set/update the resource for this path. Step 18 may be performed before performing the operation of step 17 above. For example, in step 17, the NG-RAN includes the resource allocation/setting information for Path #1 in the RRC message to be sent to the UE, and further includes the resource setting/updating information for the direct path for which it has not assigned a Path ID.

For more information, see the third example of the present disclosure of the specification.

Step 19. The UE may send and receive data over the direct path.

Step 20, the UE may send and receive data via Path #1, that is, via UE-to-Network Relay.

The UE may also provide the NG-RAN with the Path ID assigned to the indirect path in step 12 instead of step 11, unlike the example described earlier.

11-4. A Fourth Example of the Eleventh Example of the Present Disclosure of the Specification The fourth example of the eleventh example of the present disclosure describes an example in which the path ID is assigned/determined by the UE when Path #1 is an indirect path and Path #2 is a direct path.

The fourth example of the eleventh example of the present disclosure describes an example that combines the first to fifth examples of the present disclosure of the present specification. For example, the fourth example of the eleventh example of the present disclosure describes an embodiment applying the contents of the first example of the first example of the present disclosure, wherein the path ID is assigned/determined by the UE for a case where Path #1 is an indirect path and Path #2 is a direct path.

Specifically, the present disclosure describes an embodiment that applies "2) assigning a Path ID whenever the UE connects to the network on a new path (or whenever a new path is formed, or whenever a new path is desired to be formed) for an indirect path only." of the first example of the first example of the present disclosure.

The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

Figure 13A:
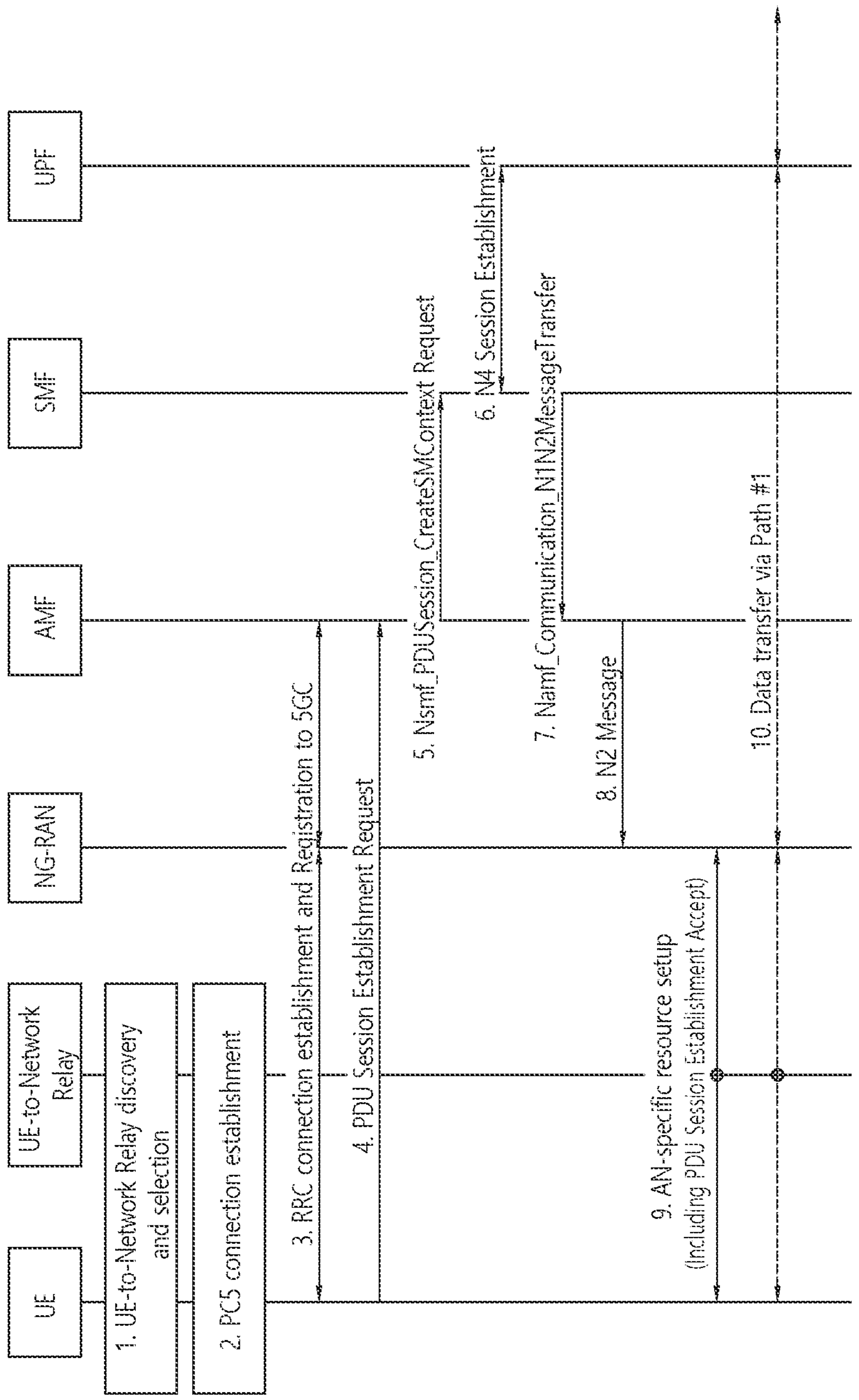
FIGS. 13*a* and 13*b* illustrate an example of operation according to the fourth example of the eleventh example of the present disclosure.
Figure 13B:
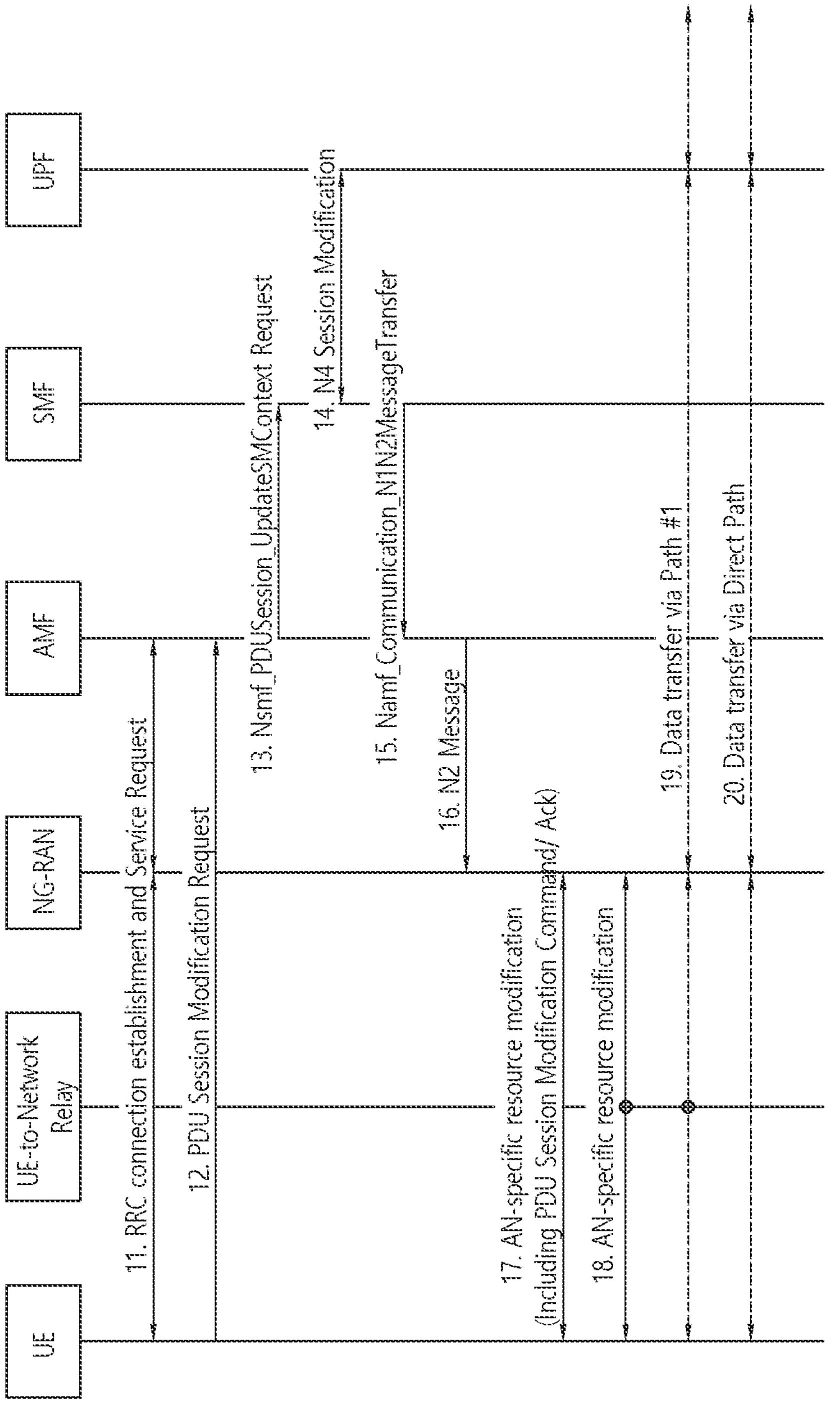

FIGS. 13*a* and 13*b* illustrate an example of operation according to the fourth example of the eleventh example of the present disclosure.

Steps 1-3. This may be performed in the same way as Steps 1-3 in FIG. 11*a* and FIG. 11*b*.

Step 4-5. The UE may request the SMF to generate a PDU session via UE-to-Network Relay and the AMF. For example, the UE may transmit a PDU Session Establishment Request message to the AMF via UE-to-Network Relay, and the AMF may transmit a request message (e.g., Nsmf_PDUSession_CreateSMContext Request message) to the SMF containing the PDU Session Establishment Request message. The UE may include the information Path ID=Path #1 in the PDU Session Establishment Request message for said request. In addition, the UE may include in the PDU Session Establishment Request message information indicating that it is a Multi-Path PDU Session, information indicating that it is an indirect path, etc.

For more information, see the first example of the first example of the present disclosure of the specification and the second example of the present disclosure of the specification.

Steps 6 through 10 may be performed in the same manner as Steps 6 through 10 in FIG. 11*a* and FIG. 11*b*.

Step 11. The UE may not assign a Path ID for the direct path. The UE may perform the RRC connection establishment procedure with the network and the service request procedure.

Step 12-13. For the PDU Session created via step 4 above, the UE may request the SMF via the AMF to modify the PDU Session or add a path. The UE may include in the PDU Session Modification Request message for said request information indicating that it is a Multi-Path PDU Session, etc.

For more information, see the second example of the present disclosure of the specification.

Step 14. This may be performed in the same way as Step 14 in FIG. 12*a* and FIG. 12*b*.

Step 15. The SMF may transmit a Namf_Communication_N1N2MessageTransfer to the AMF containing N2 SM information to be sent to the NG-RAN and NAS messages (e.g., PDU Session Modification Command messages) to be sent to the UE.

The above N2 SM information may include information about QoS Flow (information such as QFI, QoS Profile, etc.) and CN Tunnel Info (or UL NG-U UP TNL Information) for a direct path that does not assign a Path ID. Depending on such information, the SMF may not provide a Path ID for a direct path and/or may indicate that it is a direct path so that the NG-RAN may recognize that the information is for a direct path. Furthermore, the N2 SM information may include information about the updated QoS Flow for Path #1 (information such as QFI, QoS Profile, etc.) and information such as CN Tunnel Info (or UL NG-U UP TNL Information).

For more information, see the third example of the present disclosure of the specification.

The PDU Session Modification Command message may include information related to the steering/routing of the PDU Session provided to the UE, and may use the Path ID to indicate which traffic may be steered/routed to which path (including by not providing a Path ID and/or by indicating that it is a direct path so that the UE is aware that the information is for a direct path).

For more information, see the fourth example of the present disclosure of the specification.

Step 16. The AMF may send the N2 SM information and NAS messages received from the SMF to the NG-RAN.

Step 17. Based on the PDU Session related information received from the SMF, the NG-RAN may allocate/set resources for the direct path. The resource allocation/setting may be for the Uu and N3 (also referred to as NG-U) segments. For more details, reference may be made to the third example of the beginning of the specification.

The NG-RAN may also transmit a PDU Session Modification Command message to the UE. The NG-RAN may receive a PDU Session Modification Ack message from the UE.

Step 18. If the N2 SM information received from the SMF in step 16 above includes information about Path #1, the NG-RAN may set/update the resource for Path #1. Step 18 may be performed before performing the operation of step 17 above. For example, in step 17, the NG-RAN includes the resource allocation/setting information for Path #1 in the RRC message to be sent to the UE, and further includes the resource setting/updating information for the direct path for which it has not assigned a Path ID.

For more information, see the third example of the present disclosure of the specification.

Step 19. The UE may send and receive data via Path #l, i.e., via UE-to-Network Relay.

Step 20, the UE may transmit and receive data over the direct path.

The UE may provide the NG-RAN with the Path ID assigned to the indirect path in step 4 instead of step 3, unlike the example described earlier.

12. The Twelfth Example of the Present Disclosure of the Specification

The twelfth example of the present disclosure describes additional or common applications of the various examples previously described in the first through eleventh examples of the present disclosure.

In the first example through the eleventh example of the present disclosure, various examples of the present disclosure are described.

It should be noted that the description in the first example through the eleventh example of the present disclosure may apply not only to Multi-Path PDU Sessions, but also to normal PDU Sessions, i.e., PDU Sessions that are serviced over one path for 3GPP access. This may be understood as a case where the UE is connected to the network via multiple 3GPP paths, but some PDU Sessions are serviced by only one path, as shown in the example of FIGS. 8*a* to 8*d*.

If more than one indirect path is not considered in a multi-path scenario, i.e., if only one direct path and one indirect path scenario is considered, as shown in the example in FIG. 8*a* and the example in FIG. 8*c*, the Path ID may not be required to distinguish each path. In this case, it may be considered that the path type information is sufficient to distinguish the paths.

Multi-Access PDU Session (see clause 5.32 "Support for ATSSS" in TS 23.501 V16.9.0) and Multi-Path PDU Session may be supported simultaneously. For example, if a PDU Session may be serviced by both 3GPP access and non-3GPP access (i.e., a PDU Session that behaves as an MA PDU Session) and may be serviced over multiple paths as described above for 3GPP access, the following description may apply:

- The UE may determine the access type by evaluating/using ATSSS rules for traffic steering/routing. The UE may then determine a path for the subsequent 3GPP access based on a multi-path related traffic steering/routing rule/policy (e.g., see Example 4 at the beginning of the specification). Alternatively, the ATSSS rule and the multi-path related traffic steering/routing rule/policy may be provided to the UE in an integrated form. In this way, the UE may perform traffic steering/routing based on said integrated rules.
- The UPF may evaluate/utilize the Multi-Access Rule for traffic steering/routing to determine the access type, and then determine the path based on the Multi-Path Rule (e.g., see the fifth example of the present disclosure of the specification) for the 3GPP access. Alternatively, the Multi-Access Rule and the Multi-Path Rule may be provided to the UPF in an integrated form, such that the UPF performs traffic steering/routing based on said integrated form of rules.

The Path ID may also include path type information.

The PC5 link identifier, which is the identifier that identifies the unicast link formed between the UE and the UE-to-Network Relay, may be used as the Path ID for the indirect path. In this case, the network may append the PC5 link identifier with additional information (e.g., serving PLMN ID, Relay UE ID, etc.) to create a new Path ID. Alternatively, the network may store the PC5 link identifier with additional information and utilize them together. In this case, if the terminal updates the PC5 link identifier, the terminal shall inform the network of the updated identifier.

In addition, the existing information used by the terminal and each network node (e.g., NG-RAN/AMF/SMF) may be used instead of the Path ID. For example, a new PDU Session ID may be used for SM NAS signaling sent by the terminal to each path. In this case, the NG-RAN may distinguish specific paths based on the Radio Network Temporary Identifier (RNTI) information assigned to the terminal. The AMF may use TNL information, NGAP ID information, PDU Session ID, etc. assigned to the N2 association to distinguish paths. The SMF may distinguish paths by using PDU Session ID information, URI information, etc. that is created while creating a session. In this case, the terminal may send a message to the AMF containing the PDU Session ID information used in the first path or the previous path to help the AMF select the same SMF.

Figure 14:
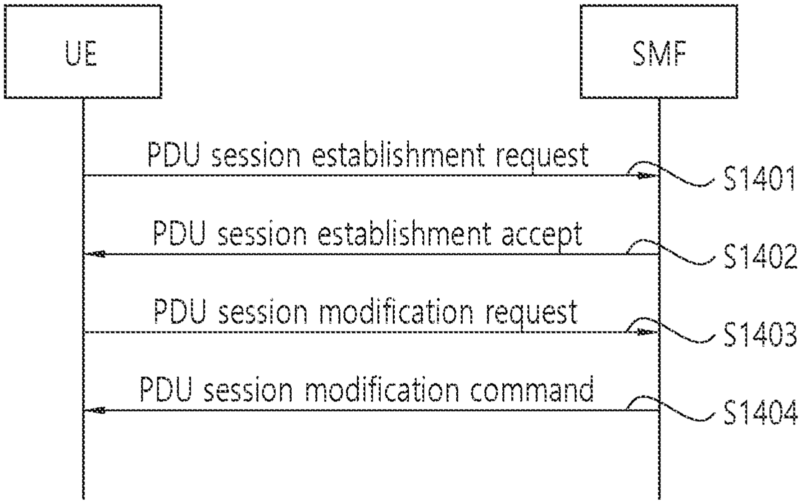
FIG. 14 illustrates an example of operation of a UE and operation of an SMF according to the present disclosure.

Referring now to FIG. 14, the following describes the operation of the UE and the operation of the SMF in accordance with various examples of the present disclosure.

The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

FIG. 14 Illustrates an Example of Operation of a UE and Operation of an SMF According to the Present Disclosure.

The example of FIG. 14 illustrates one example of terminal (e.g., UE) and/or network (e.g., NG-RAN, AMF, SMF, UPF, etc.) operations according to various examples of the present disclosure described above. It should be noted that the operations of the terminal and/or the operations of the network (e.g., NG-RAN, AMF, SMF, UPF, etc.) described in the examples of FIG. 14 is illustrative only, and the scope of the present disclosure is not limited by what is described in the examples of FIG. 14. For example, the terminal and/or network (e.g., NG-RAN, AMF, SMF, UPF, etc.) may perform the operations previously described in the first to twelfth examples of the present disclosure, even if not described in the example of FIG. 14.

The following drawings are intended to illustrate specific embodiments of the present disclosure. The designations of specific devices or the designations of specific signals/messages/fields shown in the drawings are for illustrative purposes only, and the technical features of the specification are not limited to the specific designations used in the drawings below.

In the example of FIG. 14, the UE and SMF may support MP PDU sessions as described in various examples of the present disclosure.

Note that in the example of FIG. 14, only a UE and SMF are shown, but this is for illustrative purposes only. For example, the NG-RAN, AMF, UPF, etc. described in various examples herein may also perform the operations described in the example of FIG. 14. For example, in the example of FIG. 14, a signal transmitted by the UE may be transmitted to the SMF via the NG-RAN, AMF, etc. For example, in the example of FIG. 14, the signal transmitted by the SMF may be delivered to the UE via the AMF and the NG-RAN.

In step S1401, the UE may transmit a PDU session establishment request message to the SMF for the first PDU session.

For example, the PDU session establishment request message may include information that the first PDU session is an MP PDU session. The PDU session establishment request message may be transmitted over the first path between the UE and the NG-RAN.

Before step S1401 is performed, the UE may determine whether to generate the MP PDU session, based on policy information associated with the MP PDU session, for example.

In step S1402, the UE may receive a PDU session establishment acceptance message from the SMF for the first PDU session.

In step S1403, the UE may send a PDU session modification request message to the SMF for the first PDU session.

The PDU session modification request message may be transmitted over a second path between the UE and the NG-RAN. The PDU session modification request message may include a path ID of said second path.

At step S1404, the UE may receive a PDU session modification command message from the SMF for the first PDU session.

The first PDU session may then be established via both the first and second paths.

Note that said PDU session modification command message may also include traffic information about how traffic is steered and/or routed for each of the first path and the second path. Based on the traffic information, the UE may utilize the first path and/or the second path when transmitting the uplink traffic associated with the first PDU session.

For example, the SMF may also transmit traffic information to the UPF about how traffic for the first PDU session is being steered and/or routed over the first path and/or the second path. Based on the traffic information, the UPF may then transmit downlink data to the UE over the first path and/or the second path.

For example, the SMF may transmit information about the first PDU session (e.g., information about the QoS Flow, CN Tunnel Info, etc., path information) to the NG-RAN. Based on the information about the first PDU session received from the SMF, the NG-RAN may allocate and/or establish resources for the first path and/or the second path.

As described in the present disclosure herein with reference to various examples, communications associated with MP PDU sessions may be effectively supported. For example, for a PDU session that is served by the network over multiple paths, the PDU session may be effectively supported by the SMF informing the NG-RAN for which paths it should reserve/allocate QoS Flow related resources.

As described in the present disclosure with reference to various examples, when the UE performs RRC connection establishment and registration with the network over the first path, the UE may provide the Path ID assigned to the first path to the NG-RAN. When the UE requests the SMF to create a Multi-Path PDU Session over the first path, the UE may provide the Path ID for the first path to the SMF. The SMF provides N4 rules in UPF for the first path and provides information about the PDU session to the NG-RAN. The NG-RAN may allocate/set resources for the first path. When the UE establishes an RRC connection with the network via the second path and performs a service request, the UE may provide the Path ID assigned to the second path to the NG-RAN. When the UE requests a PDU Session change or path addition to the SMF via the second path for a PDU Session created via the first path, the UE may provide the Path ID for the second path to the SMF. The SMF provides N4 rules in UPF for the second path and provides information about the PDU session to the NG-RAN. NG-RAN may allocate/set resources for the second path. SMF provides updated N4 rules to UPF for the first path, and may provide updated PDU session information to NG-RAN. The NG-RAN may update its resources for the first path. The SMF may provide the UE with steering/routing related information for the first path and/or second path of the PDU Session.

As described in the present disclosure with reference to various examples, the following illustrative descriptions may be applicable.

1) The UE may establish a connection with the 5G network via the first path:
 - When establishing a connection with the 5G network, the UE assigns a Path ID for the first path and provides it to the NG-RAN.
 - Establishing a connection with the 5G network may be one or more of the following actions: establishing an RRC connection with the NG-RAN, resuming an RRC connection with the NG-RAN, registering with the 5GC, requesting a service from the 5GC, and resuming a connection with the 5GC.
 - When establishing a connection with said 5G network, the UE may provide one or more of the following information to the NG-RAN and/or 5GC: information indicating that it supports multi-path, information indicating that it supports Multi-Path PDU Session. The NG-RAN and/or 5GC to which the UE is provided may then provide one or more of the following information: information indicating that it supports multi-path, information indicating that it supports Multi-Path PDU Session.
 - When establishing a connection with the 5G network, the UE may provide one or more of the following information to the NG-RAN and/or 5GC: information indicating which path is the first path (in this case, information indicating that it is the first path), path-related information about the first path (path type information, identification information of the UE-to-Network Relay if it is an indirect path).

2) The UE may send a request message (e.g., PDU Session Establishment Request) to the 5GC to create a Multi-Path PDU Session over the first path:
 - The request message includes the PDU Session ID.
 - The request message may include information indicating that it is for an MP PDU Session. Such information may be included in the SM NAS message delivered by SMF and/or in the NAS message containing said SM NAS message.
 - When sending the above request message, the UE may provide the Path ID for the first path to the SMF.
 - When sending the above request message, the UE may provide path-related information (path type information, identification information of the UE-to-Network Relay in case of indirect path) for the first path to the SMF.

3) The SMF may provide PDU session related information to the NG-RAN for the MP PDU session requested to be created above:

The PDU Session related information (one or more of QoS Flow related information, CN Tunnel Info) is provided with the associated Path ID information. As a result, the NG-RAN may determine/recognize which path is associated with the PDU Session, which path is associated with the QoS Flow, and which path is associated with the CN Tunnel Info. And it may allocate/set resources for those paths.

4) The SMF may provide steering/routing related information to the UE for the MP PDU session requested to be created above.

The steering/routing information may be used to indicate which traffic should be steered/routed to which path using the Path ID.

5) The UE may establish a connection with the 5G network via the second path:

When establishing a connection with the 5G network, the UE assigns a Path ID for the second path and provides it to the NG-RAN.

Establishing a connection with the 5G network may be one or more of the following operations: establishing an RRC connection with the NG-RAN, resuming an RRC connection with the NG-RAN, registering with the 5GC, requesting a service from the 5GC, resuming a connection with the 5GC, adding a path to the NG-RAN, and adding a path to the 5GC.

When establishing a connection with said 5G network, the UE may provide one or more of the following information to the NG-RAN and/or 5GC: information indicating that it supports multi-path, information indicating that it supports Multi-Path PDU Session. The NG-RAN and/or 5GC to which the UE is provided may then provide one or more of the following information: information indicating that it supports multi-path, information indicating that it supports Multi-Path PDU Session.

When establishing a connection with the 5G network, the UE may provide one or more of the following information: information indicating that a path is being added to the NG-RAN and/or 5GC, information indicating that this is the second path, information about a previously established path (such as the Path ID of the previously established path), and path-related information about the second path (such as path type information and, if it is an indirect path, identification information of the UE-to-Network Relay).

6) The UE may send a request message to the 5GC to add a second path to the Multi-Path PDU Session over the second path:

The request message includes the PDU Session ID included in the request to generate the PDU Session via the first path.

The request message may include information indicating that it is for an MP PDU Session. Such information may be included in the SM NAS message delivered by SMF and/or in the NAS message containing said SM NAS message.

When sending the above request message, the UE may provide the Path ID for the second path to the SMF.

When sending the above request message, the UE may provide path-related information (path type information, identification information of the UE-to-Network Relay in case of indirect path) for the second path to the SMF.

7) The SMF may provide PDU session related information to the NG-RAN for the path addition requested MP PDU session:

The PDU Session related information (one or more of QoS Flow related information, CN Tunnel Info) is provided with the associated Path ID information. As a result, the NG-RAN may determine/recognize which path is associated with the PDU Session, which path is associated with the QoS Flow, and which path is associated with the CN Tunnel Info. And the NG-RAN may allocate/set resources for those paths.

8) The SMF may provide steering/routing related information to the UE for the above path addition requested MP PDU session:

The steering/routing related information may use the Path ID to indicate which traffic should be steered/routed to which path(s).

9) The first path and the second path may be one of the following:

One of the paths is a direct path and the other is an indirect path.

Both paths are indirect paths. The two indirect paths may be paths through different UE-to-Network Relays.

For reference, the operation of the terminal (e.g., UE, UE-to-Network Relay) described in the present specification may be implemented by the apparatus of FIGS. 1 to 4 described above. For example, the terminal (e.g., UE, UE-to-Network Relay) may be the first device 100 or the second device 200 of FIG. 2. For example, an operation of a terminal (e.g., UE, UE-to-Network Relay) described herein may be processed by one or more processors 102 or 202. The operation of the terminal described herein may be stored in one or more memories 104 or 204 in the form of an instruction/program (e.g., instruction, executable code) executable by one or more processors 102 or 202. One or more processors 102 or 202 control one or more memories 104 or 204 and one or more transceivers 105 or 206, and may perform the operation of the terminal (e.g., UE) described herein by executing instructions/programs stored in one or more memories 104 or 204.

In addition, instructions for performing an operation of a terminal (e.g., UE, UE-to-Network Relay) described in the present disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (e.g., UE, UE-to-Network Relay) described in the present disclosure of the present specification.

For reference, the operation of a network node (e.g., AMF, SMF, UPF, etc.) or base station (e.g., NG-RAN, gNB, eNB, RAN, E-UTRAN etc.) described herein may be implemented by the apparatus of FIGS. 1 to 3 to be described below. For example, a network node or a base station may be the first device 100 of FIG. 2 or the second device 200 of FIG. 2. For example, the operation of a network node or base station described herein may be processed by one or more processors 102 or 202. The operation of the terminal described herein may be stored in one or more memories 104 or 204 in the form of an instruction/program (e.g., instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the present disclosure of the present specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the present disclosure of the present specification is not limited to such specific embodiments, and thus, modifications, changes, or may be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method comprising:

transmitting, by a user equipment (UE), a session establishment request message to a session management node;

receiving, by the UE, a session establishment accept message from the session management node;

transmitting, by the UE, a session modification request message to the session management node; and receiving, by the UE, a session modification command message from the session management node, wherein the session establishment request message is related to a first session, wherein the session establishment request message includes information informing that the first session is a multi-path (MP) session, wherein the session establishment acceptance message is transmitted over a first path, wherein the session modification request message is transmitted over a second path, wherein the session modification request message comprises first information related to a second path, wherein the first information comprises information related to a path identity (path ID) of the second path, wherein the session modification command message comprises second information related to the second path, and wherein the second information comprises at least one of information related to a path ID of the second path, or information informing that the second path is a path for a UE-to-Network Relay.

2. The method of claim 1, wherein the first session is connected to a network via both the first path and the second path.

3. The method of claim 1, further comprising:

determining to establish the first session as the MP session, based on policy information related to the MP session.

4. The method of claim 1, wherein the session establishment request message includes a path ID of the first path.

5. The method of claim 1, wherein the MP session is established via both the first path and the second path.

6. The method of claim 1, wherein the session modification command message includes traffic information about how traffic is steered and/or routed for each of the first path and the second path.

7. The method of claim 1, further comprising:

transmitting, via the first path and/or the second path, traffic related to the first session, based on the traffic information.

8. The method of claim 1, wherein the session establishment accept message includes information related to the first path, wherein the information related to the first path includes at least one of a path ID of the first path, type information of the first path, or information about the UE-to-Network Relay if the first path being through UE-to-Network Relay, and wherein the information related to the first path is used by the new generation radio access network (NG-RAN) to allocate resources related to the first path.

9. The method of claim 1, wherein the information related to the second path is used by a NG-RAN to allocate resources related to the second path.

10. A User Equipment (UE) comprising:

at least one processor; and at least one memory storing instructions and operably electrically connectable with the at least one processor, wherein operations performed based on the instructions being executed by the at least one processor include:

transmitting a session establishment request message to a session management node;

receiving a session establishment accept message for the first PDU session from the session management node;

transmitting a session modification request message to the session management node; and receiving a session modification command message for the first session from the session management node, wherein the session establishment request message is related to a first PDU session, wherein the session establishment request message includes information informing that the first session is a multi-path (MP) session, wherein the session establishment acceptance message is transmitted over a first path, wherein the session modification request message is transmitted over a second path, and wherein the session modification request message comprises first information related to a second path, wherein the first information comprises information related to a path identity (path ID) of the second path, wherein the session modification command message comprises second information related to the second path, and wherein the second information comprises at least one of information related to a path ID of the second path, or information informing that the second path is a path for a UE-to-Network Relay.

11. The UE of claim 10, wherein the UE is an autonomous device in communication with at least one of a mobile terminal, a network, and an autonomous vehicle other than the UE.

12. A method comprising:

receiving, by a session management node, a session establishment request message from a user equipment (UE) for a first session;

transmitting, by the session management node, an N4 session establishment request message for the first session to a user plane function (UPF);

transmitting, by the session management node, a session establishment accept message for the first session to the UE;

receiving, by the session management node, a session modification request message for the first session from the UE;

transmitting, by the session management node, an N4 session modification request message for the first session to the UPF; and transmitting, by the session management node, a session modification command message for the first session to the UE, wherein the session establishment request message includes information that the first session is a multi-path (MP) session, wherein the session modification request message includes information that the first session is an MP session, wherein the session modification command message includes a path identifier (ID) of the second path, and session modification command message comprises second information related to the second path, and wherein the second information comprises at least one of information related to a path ID of the second path, or information informing that the second path is a path for a UE-to-Network Relay.

* * * * *